(12) United States Patent
Yang

(10) Patent No.: US 7,546,578 B2
(45) Date of Patent: Jun. 9, 2009

(54) HIGH LEVEL MATHEMATICAL PROGRAMMING MODELING LANGUAGE IN AN OBJECT ORIENTED PROGRAMMING LANGUAGE

(75) Inventor: Jin Yang, Castro Valley, CA (US)

(73) Assignee: Oracle International Corporation, Redwood City, CA (US)

(*) Notice: Subject to any disclaimer, the term of this patent is extended or adjusted under 35 U.S.C. 154(b) by 387 days.

(21) Appl. No.: 10/439,913

(22) Filed: May 16, 2003

(65) Prior Publication Data

US 2007/0174812 A1    Jul. 26, 2007

(51) Int. Cl.
*G06F 9/44* (2006.01)
(52) U.S. Cl. .................................... 717/108
(58) Field of Classification Search ......... 717/100–104, 717/108, 126, 137, 170; 703/2, 15, 6; 705/38; 707/100, 104.1; 719/316; 700/19, 108
See application file for complete search history.

(56) References Cited

U.S. PATENT DOCUMENTS 6,606,588 B1* 8/2003 Schaumont et al. ........... 703/15
6,985,779 B2* 1/2006 Hsiung et al. ................. 700/19
7,080,384 B2* 7/2006 Wall et al. .................... 719/316
2002/0107858 A1* 8/2002 Lundahl et al. ............. 707/100

OTHER PUBLICATIONS

The MathWorks inc, "MATLAB C++ Math Library, the language of Technical Computing", User's Guide( ch. 1-4, 10); and Reference (p. 1-23)—Version 2.1 copyright 2000.*
MathWorks, 'MATLAB, The Language of Technical Computing', copyright 1984-2002, Using Matlab—version 6, by MathWorks Inc. ;<http://www.mathworks.com/access/helpdesk_r13/help/pdf_doc/matlab/using_ml.pdf >, chp. 6, 8, 10, 12, 14, 16, 18, 21, 23.*

* cited by examiner

*Primary Examiner*—Tuan Anh Vu
(74) *Attorney, Agent, or Firm*—Townsend and Townsend and Crew LLP

(57) ABSTRACT

A high level language for Mathematical Programming modeling is provided within a low level general purpose object oriented programming language. Libraries can be provided with a standard low level language enabling the use of the high level programming semantics in the low level programming environment. Using the libraries, the user can easily build complex Mathematical Programming models by using high level constructs while still taking advantage of the runtime efficiency and general purpose computing offered by the low level language.

In an embodiment, operator overloading of a low level language is used to build semantics of a high level language.

18 Claims, 13 Drawing Sheets

| Class Name | Description | Example |
|---|---|---|
| MathModel | Represents a mathematical programming model. | |
| Index | Represents an index to be used to refer to a particular decision variable within a given array of decision variables, or to refer to a particular parameter within a given array of parameters. | $j$ |
| IndexSet | Represents a set used in a model. For example, an "IndexSet" object may represent a set of potential warehouse sites in a location decision problem. | $I, J$ |
| ConstraintArray | Represents a type of constraint in a model. | $\sum_{i \in I} x_{i,j} \leq Q_j \quad \forall j \in J$ |
| ConstraintArrayU | Represents a type of constraint without specifying the valid region. | $\sum_{i \in I} x_{i,j} \leq Q_j$ |
| Over | Represents a region over which a type of constraint should hold true or over which a summation should be computed. | $\forall j \in J$ |
| IndexExp | Represents an arbitrary index expression. "Index" is a special type of "IndexExp." | $j+1$ |
| AlgebraExpArray | Represents an array of algebraic expressions involving one or more decision variables. It is a base class and may have zero, one, or more free indices. | $y_j + \sum_{i \in I} x_{i,j}$ this expression has one free index $j$ |
| Sum | A special type of "AlgebraExpArray" that represents the summation of another "AlgebraExpArray" over a given set. | $\sum_{i \in I} x_{i,j}$ |
| VariableArrayInExp | A special type of "AlgebraExpArray" that represents a decision variable in an algebraic expression. | $x_{i,j}$ |
| VariableArray | Represents an array of decision variables of the same type. | $x_{i,j}, \forall i \in I, j \in J$ |
| ConstantExpArray | Represents an array of expressions that does not include decision variables (but may include parameters and/or constants). | $Q_j + 1$ |
| ParameterArrayInExp | A special type of "ConstantExpArray" that represents a parameter used in a constant expression. | $c_{i,j}$ |
| ParameterArray | Represents an array of one type of parameter. | $c_{i,j}, \forall i \in I, j \in J$ |

FIG. 5

| Math Expression | Object Type | Components |
|---|---|---|
| $\sum_{i \in I} a_{i+1} x_{i,j} + \sum_{i \in I} y_{i,j}$ | CompExpArray | lhs = $\sum_{i \in I} a_{i+1} x_{i,j}$<br>rhs = $\sum_{i \in I} y_{i,j}$<br>opt = + |
| $\sum_{i \in I} a_{i+1} x_{i,j}$ | Sum | exp = $a_i x_{i,j}$<br>region = $i \in I$ |
| $a_{i+1} x_{i,j}$ | SimpleLinearExpArray | coeff = $a_{i+1}$<br>exp = $x_{i,j}$ |
| $x_{i,j}$ | VariableArrayInExp | baseVar = $x$<br>indExp = $i, j$ |
| $a_{i+1}$ | ParameterArrayInExp | basePara = $a$<br>indExps = $i+1$ |
| $\sum_{i \in I} y_{i,j}$ | Sum | exp = $y_{i,j}$<br>region = $i \in I$ |
| $y_{i,j}$ | VariableArrayInExp | baseVar = $y$<br>indExps = $i, j$ |

FIG. 8

| Class Name | Description |
|---|---|
| Predicate | An abstract base class for all predicates. The virtual function "evaluate" will evaluate to true or false when given values for all the relevant indices contained within the predicate object. |
| NotPred | Negates one predicate. Returns the logical opposite result of the original predicate object when evaluated by the function "evaluate." |
| InSet | Tests if a particular element is in a particular set. |
| SimplePredicate | Represents a simple type of predicate in which the left hand side is of the type "IndexExp" and right hand side is an integer, such as: $2i + j > 10$. |
| GeneralPredicate | Represents a more general form of a predicate in which the left hand side may contain arbitrary constant expressions, such as $Q_j + i \leq 25$. |
| CompPredicate | Represents a composite predicate that contains multiple predicates joined together by AND and/or OR logic. |
| IndexExp | A special type of "ConstantExpArray" that represents expressions that can be evaluated to an integer value. "Index" is a subtype of class "IndexExp." |

FIG. 13

HIGH LEVEL MATHEMATICAL PROGRAMMING MODELING LANGUAGE IN AN OBJECT ORIENTED PROGRAMMING LANGUAGE

BACKGROUND

1. Field of the Invention

The invention is related to the areas of mathematical programming modeling and object oriented programming languages. More specifically, the invention is related to high level mathematical programming modeling languages.

2. Discussion of Prior Art

As information technologies grow to maturity and are widely adopted by businesses, optimization based, intelligent decision making becomes increasingly important for companies to gain a competitive edge in the market place. Incorporating sophisticated algorithms in business application software may enable the allocation of scarce resources, improve operation efficiency, reduce costs, and increase profits. Mathematical programming (e.g., linear programming, mixed integer programming, etc.) is widely used for algorithms in real world applications.

In mathematical programming the proper values for a set of variables (called decision variables) are determined in such a way that a utility function (called an objective function) of the decision variables is minimized or maximized, while satisfying a set of constraints involving the decision variables. A mathematical programming model may be used to represent many business decision making problems. In recent years, there has been an increased usage of mathematical programming algorithms in business application software, especially by small niche vendors.

In the prior art, software, called a mathematical programming solver (which will be referred to as a solver), is used to solve for the decision variables (and to thereby solve the problem). Many commercial solvers are available today, especially for special types of mathematical programming, such as linear programming, mixed integer programming, and for special types of nonlinear programming, for example. The software that aids in setting up the problem, which is also the software that later provides the input for the solver, is called a mathematical programming modeling language, or a modeling language for short. Once the mathematical formulation for a class of business decision making problems is developed, one can use the modeling language to describe the mathematical programming model to the computer. When the code written in the modeling language is executed (or interpreted), numerical data for the specific objective function and constraints may be generated and fed to the solver.

There have been several attempts to provide modeling languages. The use of a modeling language leads to a dramatic reduction in the effort needed to use mathematical programming algorithms. In a typical example, 10,000 lines of C/C++ code for building a mathematical programming model can be replaced by about 100 lines of code in a modeling language. One example of a prior art modeling language is Algebraic Mathematical Programming Language (AMPL), developed by Bell Laboratories in the 1990s, which is regarded by some as an industry standard. Many other vendors have developed their own modeling languages, such as General Algebraic Modeling System (GAMS, available from GAMS Development Corporation, Washington, D.C.) and Xpress (available from Dash Optimization, United Kingdom), for example. AMPL and other modeling languages suffer from several drawbacks.

Prior art modeling languages are independent high-level languages. In the environments of the prior art modeling languages, the main focus is building a mathematical programming model. The prior art modeling languages are not general purpose programming languages. Consequently, it is not efficient or it may not be possible to use the prior art modeling languages to build other aspects of an application.

AMPL, and many other modeling languages, are interpretive languages. Consequently, a high runtime penalty is associated with large scale, CPU intensive number crunching. As a result, modeling languages such as AMPL and GAMS are generally used or implemented as analyst's tools. Prior art modeling languages are rarely used in production software. AMPL is used to initially experiment with different model formulations.

SUMMARY OF THE INVENTION

The invention includes providing a modeling language, which is a mathematical programming modeling language, within a programming language, which is a general purpose object oriented programming language. The modeling language of the present invention leverages the object orientation of a language, such as C++, to provide modeling semantics in the programming language environment. Having the modeling language available within a programming language allows the user to build complex models easily. The user is able to use mathematical constructs while still taking advantage of the runtime efficiency and general purpose computing offered by the programming language.

In an embodiment, operator overloading of a programming language is used to build semantics of the modeling language. Libraries may be provided within a standard programming language enabling the use of the programming semantics in the programming environment.

In an embodiment, incremental changes can be made to the model without rebuilding the entire numerical model. In an embodiment, the modeling language also provides facilities to retrieve the solutions so that the results can be analyzed.

BRIEF DESCRIPTION OF THE DRAWINGS

FIG. 5 is a chart describing the classes used in FIG. 4;

FIG. 8 shows examples of representations of algebraic expressions using the class structure of FIG. 7;

FIG. 13 is a chart describing classes used in FIG. 12;

DESCRIPTION OF EXAMPLES OF EMBODIMENTS OF THE INVENTION

At the end of the specification are three Appendices, I, II, and III. Appendix I shows an example problem involving finding the optimum locations and capacities of warehouses. Appendix II shows the mathematical programming model for the warehouse location problem described in Appendix I, and Appendix III shows some C++ code written in the modeling language that sets up and solves the mathematical programming model of Appendix II.

Figure 1:
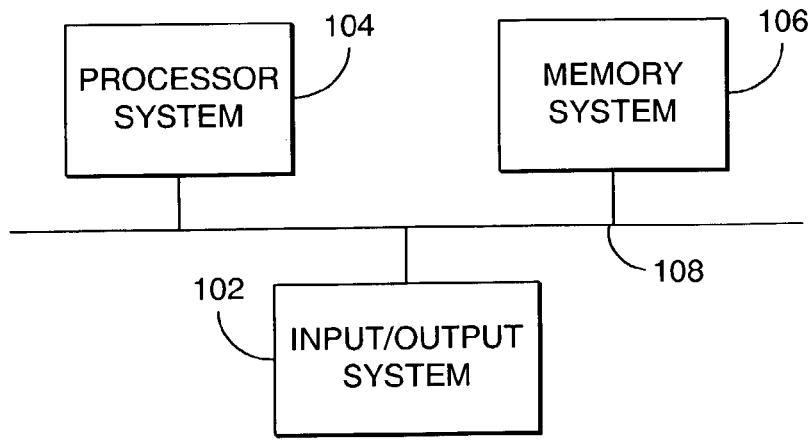
FIG. 1 shows a computing system according to the present invention.

FIG. 1 shows computing system 100. Computing system 100 includes input/output system 102, processor system 104, memory system 106, and communication system 108. In alternate embodiments, computing system 100 may have other parts in addition to or instead those listed above.

Input/output system 102 may include any number of different input and output devices such as a keyboard, a mouse, a monitor, a touch sensitive display screen, and/or an input and/or an output interface to another system. Processor system 104 may include any number of general purpose and/or specialized processors. Memory system 106 may include long term storage devices such as hard drives, floppy drives, and/or optical disc drives. Memory system 106 may also include short term memory such as Random Access Memory (RAM). Communication system 108 may be a bus, a local area network, and/or an external network such as the Internet, for example.

Figure 2:
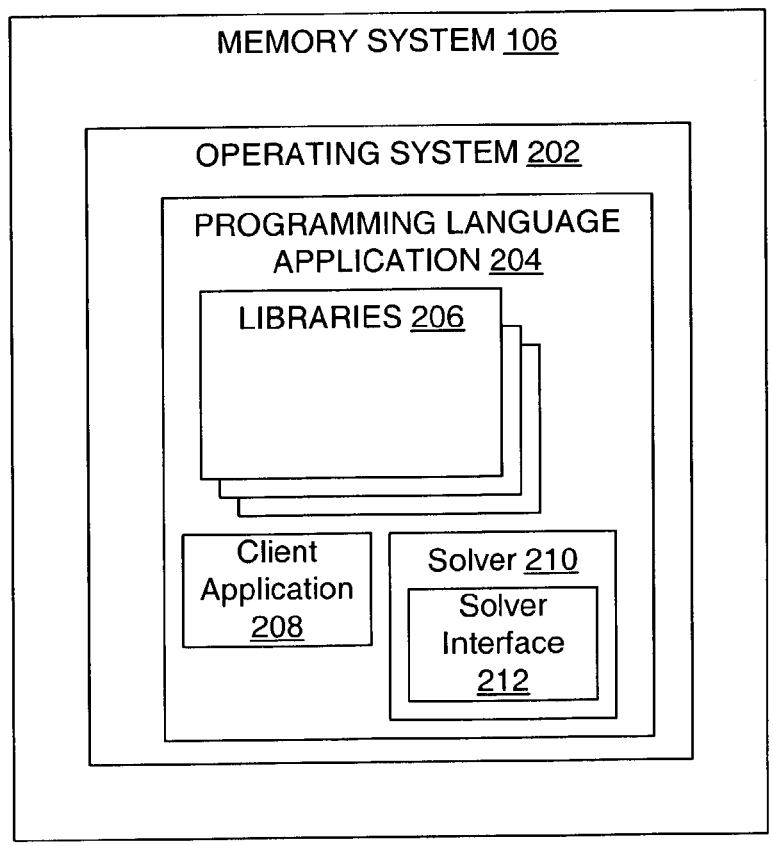
FIG. 2 shows the memory of the computing system of FIG. 1.

FIG. 2 shows memory system 106 having operating system 202 in which programming language application 204 runs, which in turn includes libraries 206. FIG. 2 also shows client application 208 and solver 210 having solver interface 212. In alternate embodiments, memory system 106 may have other components in addition to or instead those listed above.

Programming language application 204 may include a C++ or another general purpose programming language environment. Libraries 206 may include libraries for the modeling language that can be translated into a lower level executable to run in the programming environment. Client application 208 is an application built using programming language application 204 in which a mathematical model is set up and solved. Solver 210 solves the numerical problem corresponding to the mathematical problem. Solver interface 212 serves as an interface between client application 208 and solver 210. Solver interface 212 may have separate classes for nonlinear, mixed integer programming, and linear problem solvers. For example, the mixed integer programming solver interface might be a class having the name "MIPSolver."

Although possibly not previously recognized, large scale adoption of mathematical programming algorithms in a wide range of application areas by major software vendors, such as Enterprise Resource Planning (ERP) vendors has not occurred. Although possibly not previously recognized, one possible reason for the slow adoption is the difficulty in implementing software that uses mathematical programming algorithms. Although possible not previously recognized, it is desirable that the code written in the modeling language closely resemble the mathematical expressions in the formulation so that implementing, maintaining, and updating the software may be easily performed by a modeler even if the modeler does not have very sophisticated computer programming skills. Although possibly not previously recognized, in order to use AMPL (or other modeling languages) efficiently, the developer may first need to use another programming language to create text based input files that contain the abstract model and the instance data (the data for creating an instance of the model). Then the developer may need to invoke AMPL to read in and process the input files. After solving the problem, AMPL writes results to another text file. Then the developer may need to switch back to the other programming language to process the results and to provide the results to other portions of the application. Consequently, although possible not previous recognized in the the prior art, it is difficult to build a seamless interactive application using modeling languages such as AMPL. Once a model is decided upon, the developer must implement the model in another programming language for runtime efficiency.

There are other modeling languages and/or environments that can generate C/C++ code. However, although possible not previous recognized in the prior art, the machine generated code of these languages and/or environments is usually very hard for humans to maintain and deal with, and is therefore hardly used in practice. Prior art modeling tools have difficulties in properly handling net changes (i.e., small changes to the model or data associated with the model). Therefore, in the prior art, although possibly not previously recognized, making net changes often requires rerunning the modeling tools to regenerate the entire numerical model and to solve the mathematical programming model again. Rerunning the modeling tool is very inefficient when used in an interactive software environment.

However, low level, object oriented languages such as C++, are languages on which another language can be built and upon which the modeling language of libraries 206 are built. The capabilities of object oriented languages, such as C++, enable the writing of a modeling language in a way that resembles normal mathematical expressions. As an example of the technique used in building the modeling language, in C++ the lines of code MyObj obj1, obj2, obj3;

Obj1=obj2+obj3:

are meaningful if(1) one defines a new date type "MyObj," and (2) the corresponding "+" operator and "=" operator are properly defined for the object type "MyObj." In this specification, symbols, names of classes, constructors, methods, objects, and other names appearing in code segments are enclosed in quotation marks for clarity. However, the specific names, classes, objects, symbols and methods enclosed in quotation marks are given by way of example, and the modeling languages of this application is not limited to them. Further, although the specification has various statements referring to some entities, as classes and other entities having the same names as objects (which are instances of those classes), often the comments made about a class are also applicable to the corresponding objects, as will be apparent to one of ordinary skill in the art. Similarly, the comments made about objects are applicable to their corresponding class, as will be apparent to one of ordinary skill in the art.

By defining a new object type and overloading C++ operators, such as the binary operators "+" and "=," with new meanings specific to the object type "MyObj," one has effectively created a higher level language which allows the plus and assignment operations to be performed on the new high level data type "MyObj." In this specification, the term binary operator refers to an operator that maps two arguments placed on both sides of the operator into a single output, which is the way the term binary operator is used in C++. Binary operators are sometimes referred to as infix operators. The modeling language can be written without using operator overloading.

However, where operator overloading is available, one can achieve high level semantics that are easer to read.

In the rest of this specification, C++ is used as an example to illustrate one embodiment in which high level semantics are provided to write a mathematical programming model in a way that closely resembles normal mathematical expressions. In an embodiment, libraries 206 are added to programming language application 204. In an embodiment, the programming language used for the application is not interpretive, but rather is compiled. Consequently, the resulting high level mathematical programming model is also compiled.

Figure 3:
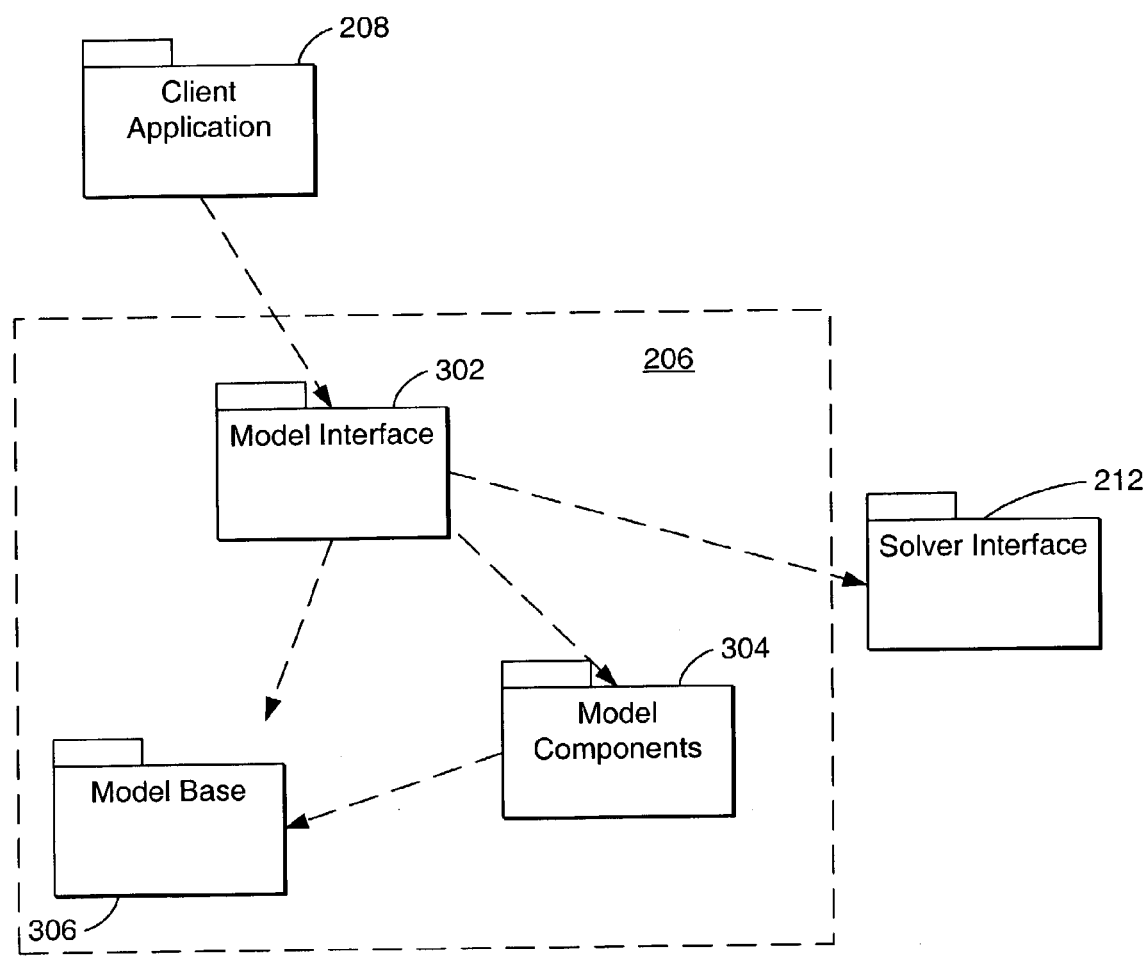
FIG. 3 is a block diagram showing an overall structural view of the libraries of FIG. 2.

FIG. 3 is a block diagram showing an overall structural view of an example of libraries 206 in relation to its environment. Libraries 206 include model interface 302, model components 304, and model base 306. In alternate embodiments, libraries 206 may have other modules in addition to or instead of those listed above. Also depicted in FIG. 3 are client application 208 and solver interface 212.

The arrows in FIG. 3 depict the dependence relationships. Client application 208 depends via model interface 302 upon libraries 206 to set up the mathematical programming problem. Libraries 206 via model interface 302 depend upon solver interface 212 to interface with solver 210 (FIG. 2), which solves the mathematical programming problem. In other words, model interface 302 provides the main interface for client application 208 to interact with a mathematical programming model of libraries 206, and interface 302 also provides an interface for libraries 206 to interact, via solver interface 212, with solver 210. Model interface 302 depends on model components 304 and model base 306 for setting up the mathematical programming problem.

In one embodiment, model interface 302 may contain a class for representing a mathematical programming model, which may be called "MathModel." This class represents an abstract mathematical programming model. The numerical model is not stored in the "MathModel" object, but is generated when needed and is passed to the mathematical programming solver. The "MathModel" class provides the main client interface to interact with a mathematical programming model. Specifically, model interface 302 may provide methods for the following types of functions: (1) add/remove constraints to/from the model, and add/remove an objective function to/from the model; (2) attach the model to a specific solver and generate numerical model data to pass to the solver through a method that, for example, may be designated as "attach"; (3) solve the numerical model through solver 210 (FIG. 2) and return the solution; and (4) update the model with incremental changes, and pass the incremental changes of the numerical model to the solver through a method that may be designated as "updateModel."

Model components 304 contains all the underlying components that support the client interaction with a mathematical programming model. Model base 306 provides the basic facilities for the modeling language, such as facilities for configuring the modeling language in a specific client environment. Both model interface 302 and model components 304 depend upon model base 306. The modeling language depends on the solver interface 212 for accessing a mathematical programming solver's capability (e.g., solver 210) to solve a numerical mathematical programming model and to return a solution.

Figure 4:
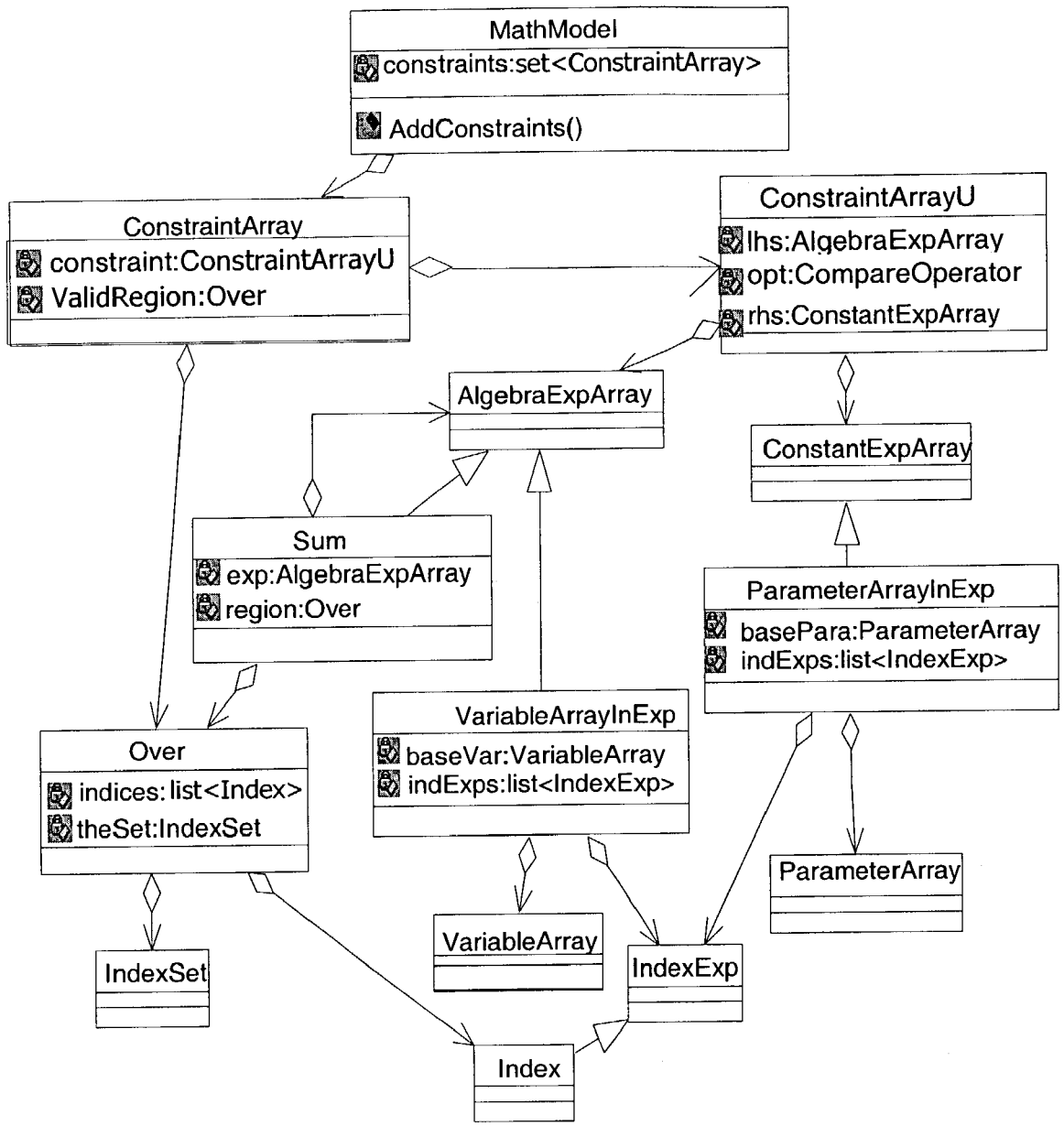
FIG. 4 shows an embodiment of a class structure that supports the "addConstraints" method of the "MathModel" object.

FIG. 4 and FIG. 5 illustrate an embodiment of a portion of the "MathModel" class that enables it to represent constraints of a mathematical programming model. FIG. 4 is a Unified Modeling Language (UML) diagram, which is a popular object-oriented modeling method that is used to document an object-oriented software design. FIG. 5 lists the classes used in FIG. 4 with a brief description for each class and a corresponding example of mathematical formula that the class may represent.

In FIGS. 4, 6, 7, 9 and 12, a rectangle with three parts represents a class. The name of the class is in the top portion of the rectangle. Data members of the class are in the middle part of the rectangle (other data members may be included in addition to or instead of those shown). The data members are shown with the data member name to the left of a colon followed by the data member's type to the right of the colon. The data member of a class is an attribute that the object instance of that class should have. The methods (also called member functions) are in the bottom part of the rectangle. In any of the classes in the FIGS. 4, 6, 7, 9, and 12, other methods may be included in addition to those shown.

Some methods have "<<virtual>>" preceding their name indicating that the method is implemented in its derived classes. However, functions that are indicated as virtual in this embodiment may be located elsewhere and may not be virtual in alternative embodiments. Some of the data members have a type of set, list, or array with the type of the individual elements of the set list or array enclosed in "< >." An array is a collection of elements. A set is a collection of elements in which none of the elements are duplicates of one another. A list is a collection of elements having sequential access. For example, the class "MathModel" has a data member "constraints" whose type is a set having elements of a type "ConstraintArray." However, whether a particular collection of elements is a set, list, or array may differ in embodiments that are alternatives to the embodiments in FIGS. 4, 6, 7, 9, and 12.

At the left of some of the data members and methods are padlock icons for indicating that the data member or function is private. At the left of other data members are diamond shaped icons for indicating public access. However, the icons for indicating private and public access are provided only as examples of a manner of implementing the modeling language. Alternative embodiments may have public or private access allowed to different data members and/or methods than those indicated in FIGS. 4, 6, 7, 9, and 12.

A line connecting two classes having a diamond at one end and an arrow at the other end represents a containment (or aggregation) relationship in which the class on the end having the diamond contains the class on the end having the arrow. For example, in FIG. 4 one can read "MathModel" class contains "ConstraintArray" class. The contained class may be a data member of the class within which it is contained. A line connecting two classes with a triangle at one end represents an inheritance relationship in which the class on the side without the triangle is inherited from the class on the side with triangle. For example, in FIG. 4, one can read "Sum" class is inherited or derived from the "AlgebraExpArray" class, the "AlgebraExpArray" class is inherited by the "Sum" class, or the "Sum" class is a sub-type of "AlgebraExpArray." The classes shown in FIGS. 4, 6, 7, 9, and 12 may include many other details in addition to or instead of those shown.

In FIG. 4, a "MathModel" object contains a set of "ConstraintArray" objects. Each "ConstraintArray" object is used to represent one type of constraint. Each type of constraint may have many instances, and therefore may represent an array of constraint equations. For example, the set of inequalities $$\sum_{i \in I} x_{i,j} \leq Q_j \quad \forall j \in J$$

may be a constraint type in a particular mathematical programming model, where $x_{i,j}$ is a decision variable in the model, $Q_j$ is a parameter of the model, I, J are index sets associated with the model, and i, j are indices defined on the corresponding index sets. Each "ConstraintArray" object, in turn, contains an "Over" object and a "ConstraintArrayU" object. An object of the "ConstraintArrayU" class represents a constraint type without specifying its valid region, such as the expression $$\sum_{i \in I} x_{i,j} \le Q_j.$$

An "Over" object represents a region or a range of indices over which a constraint type should hold true or a summation should be computed, and may have a similar meaning to a mathematical expression such as $\forall j \in J$. An "Over" object contains the information that allows it to enumerate every element in the region once the associated "IndexSet" object has been populated. As shown in FIG. 4, an "Over" object contains one or more "Index" objects and an "IndexSet" object, which are two object types that are closely related to the mathematical terms index and index set, respectively. In an embodiment, in constructing an "Over" object as part of the "addConstraints" method of the "MathModel" class one may need to pass one or more "Index" objects and one "IndexSet" object as arguments of the constructor of the "Over" object.

Indices of the "Index" class and index sets of the "IndexSet" class may be useful in building algebraic expressions. For example, in the expression $$\sum_{i \in I} x_i$$

one understands that for each element i in the set I there is a corresponding variable $x_i$, and the summation is over all possible variables $x_i$ having indices that are elements in the set I. The "Index" class may represent an index of various types, such as integer, string, or object handle (e.g., an object pointer). An "Index" object is primarily used to refer to a particular decision variable in an array of decision variables or a particular parameter in an array of parameters when building a mathematical programming model.

The "IndexSet" class may represent a set of various types, which may be one dimensional or multi-dimensional. In an embodiment, each dimension of the element in an "IndexSet" object has a type, which may be integer, string, or object handle, for example. A one-dimensional "IndexSet" object may be constructed directly by specifying the structure of the set. For example, in the following code segment a structure is specified.

IndexSet I(10, 2, 5); //The numbers 10, 2, and 5 specify "start," "increment," and
    // "count," respectively. This will create a set I={10, 12, 14, 16, 18}.

As in C++, any text following the "//" on the same line are comments. An "IndexSet" object may also be constructed based on one or more existing index sets, such as in the code segment:

// Assume "I" and "J" are of the type "IndexSet."
    IndexSet IJ(I, J) // This statement defines a two-dimensional set which is the
    // cross product of the set "I" and the set "J."

The new "IndexSet" object may be constructed either from two or more lower dimensional "IndexSet" objects or from one "IndexSet" object of the same dimension by restricting it to a subset of the existing set. A two-dimensional index set may be created by fixing the index of one dimension in a three-dimensional index set. An example of creating a two-dimensional index set by fixing the index of one dimension is provided by the following code segment:

IndexSet I(0, 1, 1000), J(0, 1, 2000), K(0, 1, 300), IJK(I, J, K);
    Index i, j, k;
    VariableArray x(I,J,K);
    // Assume "myModel" is an object of class "MathModel."
    myModel.addConstraints(Over(i,I), Sum(Over(j,k,IJK (&i,NULL,NULL)) x(i,j,k))==1);
    // In the above statement "IJK(&i,NULL,NULL)" creates a 2-dimensional
    // set by fixing the first dimension to the value of "i" in the
    //3-dimensional set "IJK."

In many situations, being able to first specify a larger set and then use the larger set to form smaller sets simplifies the programming involved in forming sets in general and index sets in particular.

The "IndexSet" object may also be specified as an implicit index set or an explicit index set. An implicit index set does not have to store the member elements, but relies on its child index sets to form the set elements. An explicit index set needs to store all member elements. For an explicit index set, "IndexSet" class offers interfaces (which are methods that are called via a programming statement) to add/remove elements to/from the index set. The "IndexSet" class may provide a method to test if a particular element is within the set or not.

The number of "Index" objects has to match the dimensions of the "IndexSet" object as in the following code segment:

IndexSet I(0, 1, 1000), J(0, 1, 2000), K(0, 1, 300), JK(J, K);
    Index i, j, k;
    VariableArray x(I,J,K);
    // Assume "myModel" is an object of the "MathModel" class.
    myModel.addConstraints(Over(i,I), Sum(Over(j,k,JK) x(i,j,k)) ==1);

The "IndexSet" class may also keep track of the net change information related to changes in the "IndexSet" object. The net change information for an "IndexSet" object may later be used in a mechanism of generating incremental change to the numerical model when the "updateModel" method of the "MathModel" class is called.

The "Index" class is inherited from the "IndexExp" class, which is used to represent an arbitrary index expression, such as j+1 in $x_{j+1}$. In an embodiment, a single index may be a special type of index expression. The "IndexExp" class is a subclass of the "ConstantExpArray" class.

A virtual function of the subclass "IndexExp" is "evaluateInt," which evaluates to an integer when given values of all the relevant indices. The class "ConstantExpArray" has a virtual function "evaluate" which evaluates to a number when given values of all the relevant indices. In an embodiment, there may be a variety of overloaded operators, such as "+," "−," "*" and "/," that return the type of "IndexExp" when the left hand side argument and right hand side argument are given, thereby allowing expressions formed by indices to be written within program statements. Index expressions may be used in variable subscripts, parameter subscripts, and predicates, for example. The capability of using an arbitrary index expression allows for writing statements that are close in format to mathematical expressions that include mathematical expressions in the indices, for example.

The "ConstraintArrayU" class contains the "AlgebraExpArray" class. An object of "ConstraintArrayU" may be represented by an "AlgebraExpArray" object on the left hand side, a "ConstantExpArray" object on the right hand side, and a comparison sign joining together the right hand side and the left hand side, as indicated by the containment relationships in FIG. 4. In other embodiments, an "AlgebraExpArray" object may be placed on the left hand side, right hand side, or both, and a "ConstantExpArray" object may be placed on either the right hand side or the left hand side. To facilitate this composition of a "ConstraintArrayU" object from an operator, an "AlgebraExpArray" object, and a "ConstantExpArray" object, comparison operators, such as ">=," "<=," and "==," are overloaded to return an object of "ConstraintArrayU" when the left hand side argument and right hand side arguments are given. This allows for the writing of constraints in the mathematical programming model.

The class "AlgebraExpArray" is used to represent an array of algebraic expressions involving one or more decision variables. An object of "AlgebraExpArray" may contain zero, one, or more free indices. For example, the expression array $$y_j + \sum_{i \in I} x_{i,j}$$

has one free index, j. The "AlgebraExpArray" class may be a base class (a base class is a class that allows other classes to be derived from it, and derived classes or inherited classes will have the attributes and behaviors of the base class). Two of the "AlgebraExpArray" class' tangible classes, "VariableArrayInExp" and "Sum," are shown on FIG. 4 (a tangible class is a class that is derived from another class, for example a base class, and is capable of creating an object). The "VariableArrayInExp" class is used to represent a special type of "AlgebraExpArray" that allows one to access decision variables. For example, $x_{i,j}$ or $x_{i+1,j}$ could be represented by a "VariableArrayInExp" object. As shown in FIG. 4, the "VariableArrayInExp" class contains the "VariableArray" class and the "IndexExp" class. When a "VariableArray" object is constructed, one may specify which index set or index sets the object will be based on. The actual variables are not generated until the method "attach" of the class "MathModel" is called.

The "VariableArray" class may have one or more methods to set the variable type to "continuous," "integer," or "binary," for example, according to the needs of the problem being solved. A continuous variable type may assume a continuum of values, an integer variable type may assume only integer values, and a binary variable type may assume only one of two values. The "VariableArray" class may also have one or more methods for setting bounds for the values of the variables so that the "MathModel" object can communicate the information to the attached solver. The class "VariableArray" also has a "( )" operator overloaded as a member function to return a "VariableArrayInExp" object when given a number of "Index" or "IndexExp" objects as input arguments. For example, in the code segment // "I" and "J" are of the type "IndexSet."
Index i, j;
VariableArray x(I,J);
// Assume "myModel" is of the type "MathModel."
myModel.addConstraints(Over(i,I), Sum(Over(j,J),x(i+1, j))) <=1);

The x(i+1,j) forms a "VariableArrayInExp" object by invoking the operator "( )" of "VariableArray" object with the arguments i+1 and j. The i+1 and j arguments return the corresponding index expressions to the x object. The "VariableArray" class may also have an interface to access the solution value corresponding to an individual decision variable within the variable array.

The "Sum" class may be used to represent the summation of another "AlgebraExpArray" over a given set, similar to $$\sum_{i \in I} (x_{i,j} + y_{i,j})$$

which is an "AlgebraExpArray" in which the "AlgebraExpArray" $x_{i,j}+y_{i,j}$ is summed over the "IndexSet" I. From FIG. 4, one can see that a "Sum" object contains an "Over" object and an "AlgebraExpArray" object, where the "Over" object is used to specify the valid region over which the summation should be computed and the "AlgebraExpArray" object is used to represent the term inside the summation sign. The "Sum" class and the "AlgebraExpArray" class are recursively related. Specifically, the "Sum" object is a sub-type of the "AlgebraExpArray" object, and a "Sum" object also contains another "AlgebraExpArray" object as one of its components. This type of recursive representation allows the mathematical programming model to represent arbitrary, complex algebra expressions.

In an embodiment, the right hand side of a "ConstraintArrayU" object is a "ConstantExpArray" object, which is used to represent an array of expressions that does not include decision variables (it may only include parameters and/or constants), such as $Q_j$–5. As indicated in FIG. 4, one special type of "ConstantExpArray" is "ParameterArrayInExp," which is used to represent parameters having index expressions in their indices, such as $Q_j$ or $Q_{j+1}$. A "ParameterArrayInExp" object contains a "ParameterArray" object and an "IndexExp" object where the former represents an array of parameters in a model and the latter represents the index expression used to address the parameter, such as j+1 in the parameter expression $Q_{j+1}$.

"ParameterArray" objects may be used in "IndexExp" objects. For example, if "P" is a parameter array that is of an integer type, and if "i,j" are of the type "Index", then "P(i)+j" would result in a valid "IndexExp" object. The capability of using of parameter arrays in index expressions further enhances the flexibility in the types of index expression that can be used within other objects.

Similar to an "IndexSet" object, a "ParameterArray" object may have the capability to track net changes. Consequently, when the "updateModel" method of the "MathModel" class is called, it can in turn interrogate the relevant "IndexSet" objects and "ParameterArray" objects to get the detailed net-change in order to form the net-change for the numerical instance of the mathematical programming model. One can also specify the default behavior when an attempt is made to access a parameter that is not explicitly stored in the parameter array. These default behaviors may include (1) assuming the missing value to be zero or another pre-specified value; (2) assuming the term associated with the missing parameter does not exist; or (3) generating an error and/or an exception to alert the user about the missing parameter.

To better understand the class structure of FIG. 4, the following demonstrates how a code segment can be written that closely resembles a mathematical expression and is supported by the class structure of FIG. 4. With the class structure in FIG. 4, a constraint of a mathematical programming model, such as $$\sum_{i \in I} x_{i,j} \leq Q_j \quad \forall \ j \in J,$$

may be added to the model using the "addConstraints" method of "MathModel" in a C++ statement such as:
// Assume "myModel" is an object of the "MathModel" class,
// "i" and "j" are of type "Index,"
// "I" and "J" are of the type "IndexSet,"
// "x" is of the type "VariableArray," and
// "Q" is of the type "ParameterArray."
myModel.addConstraints(Over(j,J), Sum(Over(i,I),x(i,j)) <=Q(j));

The above non-comment statement will be referred as Code Segment 1 later in this specification. Code Segment 1 is written in the modeling language, and is a C++ statement that closely resembles its corresponding mathematical expression. The reason Code Segment 1 is valid is as follows. Using the "addConstraints" method, a "ConstraintArray" object, the constraint array corresponding to "Over(j,J), Sum(Over(i,I), x(i,j)) <=Q(j)," may be constructed from two input arguments, and the result may be stored in the data member "constraints" of the "MathModel" class. Therefore, since the "addConstraints" method of Code Segment 1 takes two arguments, one of the type "Over," which in this case is "Over(j, J)," and the other of the type "ConstraintArrayU," Code Segment 1 is valid if "Sum(Over(i,I),x(i,j))<=Q(j)" has the type "ConstraintArrayU."

Regarding showing that "Sum(Over(i,I),x(i,j)) <=Q(j)" may have the type "ConstraintArrayU," FIG. 4 indicates that "ConstraintArrayU" is composed from an "AlgebraExpArray" object joined by a "CompareOperator" object (representing a comparison operator) to a "ConstantExpArray" object. The operator "<=," as used in the expression "Sum (Over(i,I), x(i,j)) <=Q(j)" of Code Segment 1, is overloaded to take two arguments one of the type "AlgebraExpArray" and one of the type "ConstantExpArray" so that it can be a valid "CompareOperator." Thus, since the class "Sum" is a sub-type of "AlgebraExpArray," therefore the "Sum" object "Sum(Over(i,I),x(i,j))" is a valid left hand side argument of the "CompareOperator" data member of the "ConstraintArrayU." Thus, as long as "Q(j)," is a "ConstantExpArray" type (as will be demonstrated below), "Sum(Over(i,I), x(i,j))<=Q (j)," is a valid "ConstraintArrayU" object.

Regarding "Q(j)" being the type "ConstantExpArray," the "( )" operator of "ParameterArray" (of the variable "Q" in Code Segment 1) is overloaded so that it takes the "IndexExp," "j," and returns an object that is the type "ParameterArrayInExp." Since the "ParameterArrayInExp" type is a sub-type of "ConstantExpArray," as shown in FIG. 4, therefore the two input arguments for the "<=" operator in Code Segment 1 are of the types it requires, as indicated in the box representing the "ConstraintArrayU" class.

Regarding the validity of the object "Sum(Over(i,I),x(i, j))," a "Sum" object may be constructed from an "Over" object and an "AlgebraExpArray" object, as indicated by the containment relationships in FIG. 4. The first argument, Over (i,I), is clearly an "Over" object, and thereby satisfies the requirements for the first argument of the "Sum" object. The second argument, the "x(i,j)," in the "Sum" constructor in Code Segment 1, "Sum(Over(i,I),x(i,j))," is supplied by the overloaded operator "( )" of the variable array class. The input of "i,j" is permissible because the "( )" operator of a "VariableArray" object may take one or more "IndexExp" objects (e.g., "i,j") as input and may return an object of the type "VariableArrayInExp," "x(i,j)," which is a sub-type of "AlegebraExpArray." Consequently, the second argument, "x(i,j)," is valid, because it is of the type required by the "Sum" object. It follows that since the object "Sum(Over(i, I),x(i,j)" is constructed from the "Over" object, "Over(i,I)," and the "AlgebraExpArray" object, "x(i,j)," therefore the "Sum(Over(i,I),x(i,j)" object is valid. Thus, each of the portions of Code Segment 1 have been shown to be supported by the class structure of FIG. 4.

Using "IndexExp" objects having "ParameterArray" objects, mathematical expressions more complex than Code Segment 1, may also be included within the arguments of the "addConstraints" method. For example, the constraint type $$\sum_{i \in I} x_{i+1,j-P(i)} \leq Q_{2j+1} \quad \forall \ j \in J \land 2j - P(j) > 1$$

may be added to the model via a C++ code segment, such as
// Assume "myModel" is of the type "MathModel,"
// "P" and "Q" are of the type "ParameterArray,"
// "i" and "j" are of the type "Index," and
// "I" and "J" are of the type "IndexSet."
myModel.addConstraints(Over(j,J, 2*j–P(j)>1),Sum (Over(i,I), x(i+1,j–P(i)))>=Q(2*j+1));

which is more complex than Code Segment 1 in that it includes index expressions in the indices.

Figure 6:
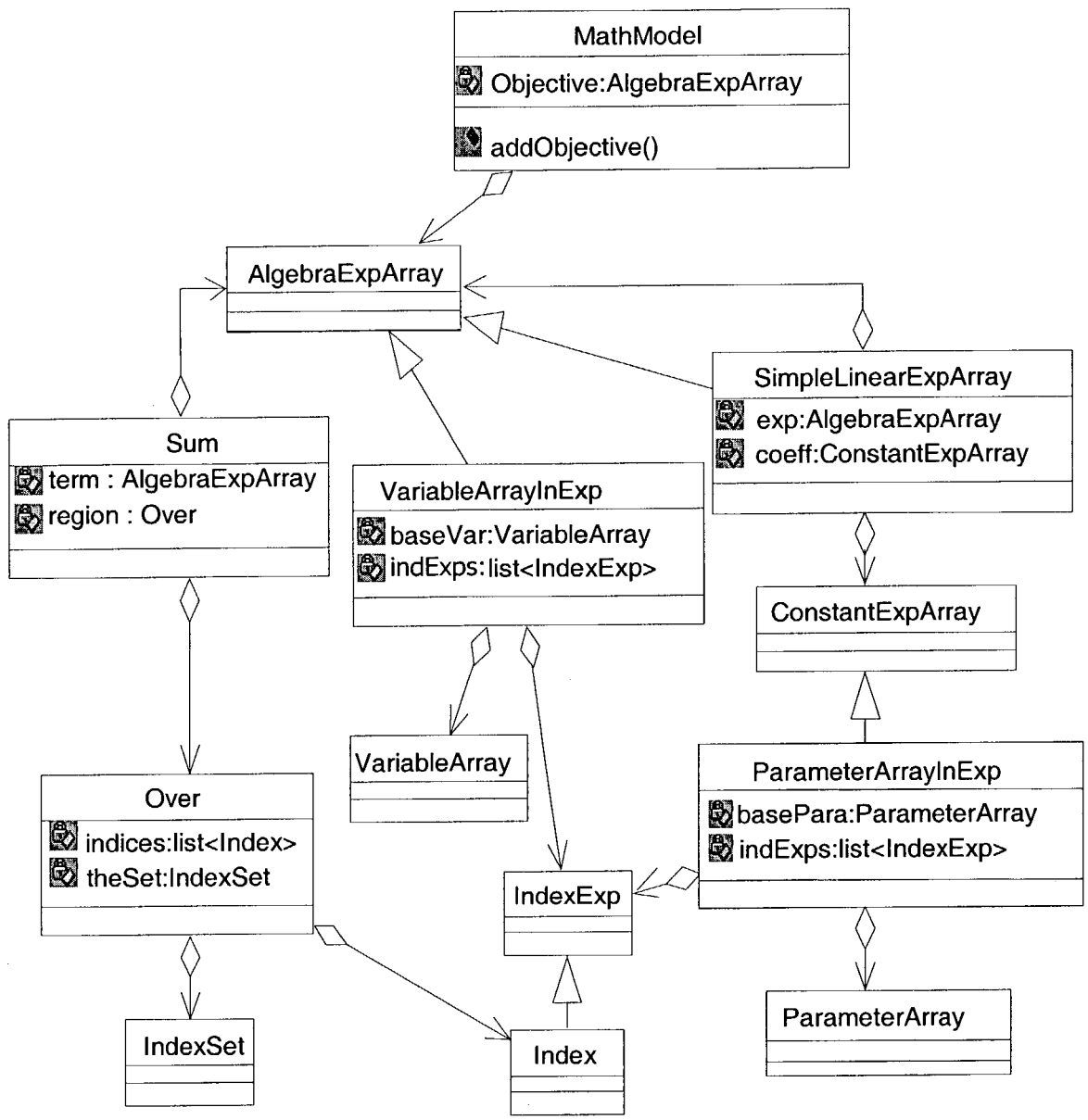
FIG. 6 shows an embodiment of a class structure that supports the "addObjective" method of the "MathModel" object.

FIG. 6 shows an embodiment of a class structure that may support the "addObjective" method. In an embodiment, an objective function of a mathematical programming model may be added to the model through the method "addObjective" of the "MathModel" class (the "addObjective" method may be replaced by any method for adding an objective). For example, the expression $$\sum_{i \in I} \sum_{j \in J} c_{i,j} x_{i,j}$$

may be the objective function of a particular mathematical programming model, where $x_{i,j}$ is a decision variable in the model, $C_{i,j}$ is a parameter of the mathematical programming model, I, J are index sets associated with the mathematical programming model, and i, j are indices defined on the corresponding index sets. The following C++ statement may add the objective function to the model:
// Assume that "myModel" is an object of the "Math-Model" class,
// "i" and "j" are of the type "Index,"
// "I" and "J" are of the type "IndexSet,"
// "x" is of the type "VariableArray," and
// "c" is of the type "ParameterArray."
myModel.addObjective(Sum(Over(i,I),Sum(Over(j,J),c(i, j)*x(i,j))));

The "MathModel" object, "myModel," contains an "AlgebraExpArray" object, "Sum(Over(i,I),Sum(Over(j,J),c(i,j)*x (i,j)))," which is used to represent the objective function, $$\sum_{i \in I} \sum_{j \in J} c_{i,j} x_{i,j}$$

(which in this case does not have any free index).

The class "SimpleLinearExpArray" is another tangible type of "AlgebraExpArray," as shown in FIG. 6. The "SimpleLinearExpArray" class is used to represent a "ConstantExpArray" object being multiplied by a "AlgebraExpArray" object such as $c_{i,j}x_{i,j}$ (the "SimpleLinearExpArray" class may be replaced by any simple linear expression array class). In alternative embodiments, one or more classes may be included to handle other types of arrays such as nonlinear arrays. These classes may be included in addition to or instead of the "SimpleLinearExpArray" class. The rest of the mechanism for the "addObjective" method is similar to the "addConstraints" method.

In an embodiment, a constraint type or the objective function of a "MathModel" object may be removed. For example, the "addConstraints" method and the "addObjective" method may take an optional argument that assigns a name to the constraint type or the objective function. A "removeConstraints" method (not shown in FIGS. 4, 6, 7, 9, and 12) and a "removeObjective" method (not shown in FIGS. 4, 6, 7, 9, and 12) of the "MathModel" class take the name as an argument and delete the corresponding data from the "MathModel" Object (the "removeConstraints" method may be replaced by any remove constraint method, and the "removeObjective" method may be replaced with any remove objective method).

Thus, the model building methods of the "MathModel" class may be performed by storing the abstract model as data members, such as "objective" and "constraints." In this embodiment, the representation of the abstract model is achieved through hierarchical containment, for example "MathModel" contains "ConstraintArray" which in turn contains "Over" and "ConstraintArrayU," etc. Additionally, the representation of the abstract model is achieved through recursive composition, such as the recursive composition of the "AlgebraExpArray" class and its subclasses that will be discussed below in conjunction with FIG. 7.

The same class structure, as shown in FIG. 4 and FIG. 6, that supports the model building methods, such as the "addConstraints" method and the "addObjective" method, may also support generating the numerical model from the mathematical programming model once the associated "IndexSet" objects and "ParameterArray" objects are populated with data. As indicated in FIGS. 4 and 6, respectively, the "MathModel" class contains an objective function (of the type "AlgebraExpArray") and a set of constraint types (of the type "ConstraintArray"). The "ConstraintArray" object, in turn, includes an object of the type "Over" and an object of the type "ConstraintArrayU."

As a result of the "ConstraintArrayU" object, containing an object of the type "AlgebraExpArray" and an object of the type "ConstantExpArray," given one element in the "Over" object, one can access a specific constraint in the "ConstraintArrayU" object. For example, if $J=\{1,2,3,4,5,6\}$, constraints such as $$\sum_{i \in I} x_{i,j} \leq Q_j \quad \forall j \in J$$

corresponds to six specific constraints. While iterating through the elements in J, for example, at $j=3$, one gets a corresponding constraint $$\sum_{i \in I} x_{i,3} \leq Q_3,$$

in which $$\sum_{i \in I} x_{i,3}$$

is one algebraic expression (containing no free index) and $Q_3$ is one constant expression (also containing no free index). In an embodiment, by fixing a free index (or indices) to a specific value (or values) in an "AlgebraExpArray" object, one may cause the "AlgebraExpArray" object to generate the numerical instance of that one algebra expression. Similarly, in an embodiment, fixing the free index (or indices) to a specific value (or values) in a "ConstantExpArray" object, causes the "ConstantExpArray" object to compute a specific value of that one constant expression, using, for example, the virtual function "evaluate" (a method for evaluating expressions discussed above).

Figure 7:
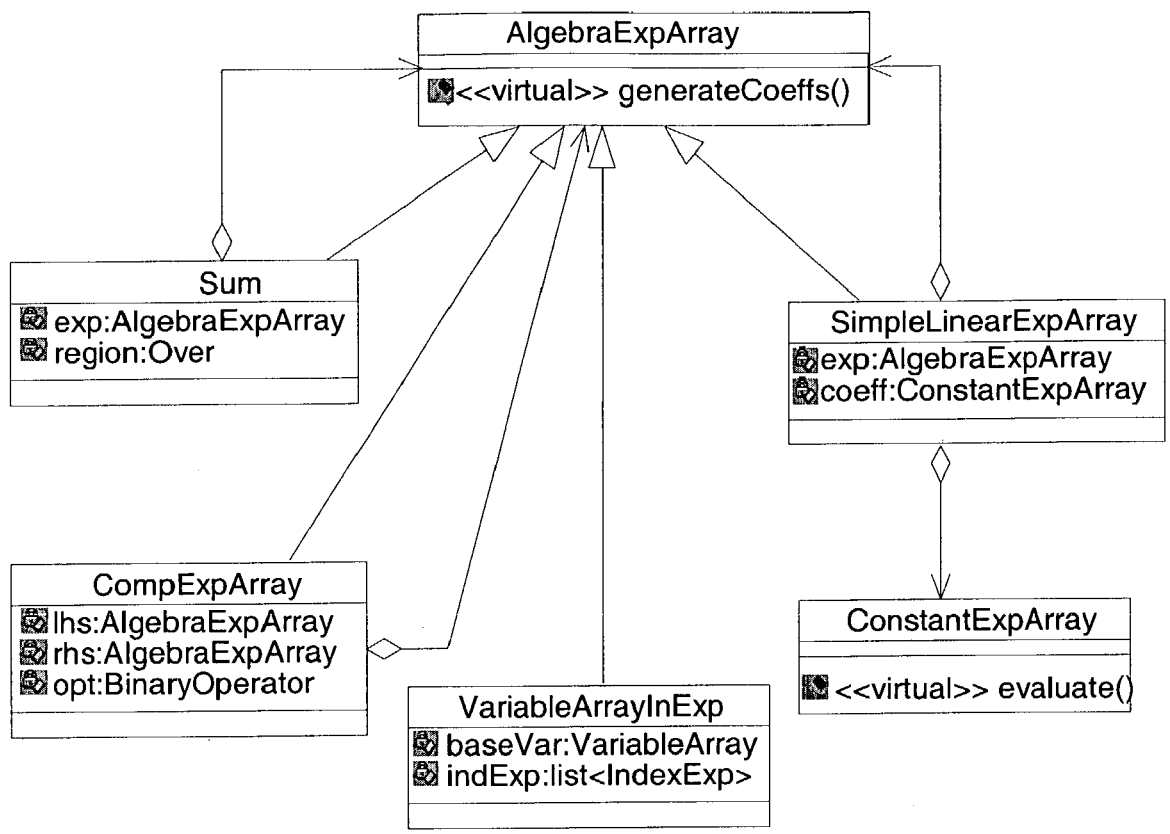
FIG. 7 shows an embodiment of a recursive representation of algebraic expressions.

FIG. 7 shows an embodiment of a class structure that supports the capability of generating coefficients of a linear algebraic expression, which can be used to generate numerical instances of a linear programming model. As an example of generating a numerical instance, a virtual function called "generateCoeffs" (a function for generating coefficients, FIG. 7) might be used for generating linear expressions.

As an example, "AlgebraExpArray" can be used to generate a numerical instance by specifying one or more free indices of an algebraic expression. In the following discussion, a linear programming example is used, in which the "AlgebraExpArray" class represents an array of linear algebra expressions. However, the modeling language is not limited to linear programming, but may be applied to nonlinear, mixed integer, and other types of mathematical programming models as well. In linear programming embodiments, generating the numerical instances of algebraic expressions may be performed by generating the coefficients associated with the decision variables used in the expressions.

In the FIG. 7 embodiment, the "AlgebraExpArray" class is the base class for four tangible subclasses. With the exception of the subclass "VariableArrayInExp," all subclasses of "AlgebraExpArray" use one or more objects of the "AlgebraExpArray" class recursively to represent a specific type of expression array. For example, the "Sum" class contains a data member of the "AlgebraExpArray" type, which represents the expression array within a summation sign (and a data member of the "Over" type, which represents the region over which the summation is computed), while the "AlgebraExpArray" class is inherited by the "Sum" class. Similarly, the "CompExpArray" class (a composite expression array class) represents a composite algebra expression array that is formed by joining two "AlgebraExpArray" objects (which are the left hand side and the right hand side, with a binary operator), while the "AlgebraExpArray" class is inherited by the "CompExpArray" class.

As an example of the recursive representation of the classes of FIG. 7, FIG. 8 shows how an expression array $$\sum_{i \in I} a_{i+1} x_{i,j} + \sum_{i \in I} y_{i,j},$$

may be represented.

In FIG. 7, the base class "AlgebraExpArray" has a virtual function "generateCoeffs" that produces the numerical coefficients for every decision variable used in the one corresponding algebraic expression once the free index/indices is/are given a specific value/values, thereby specifying one expression within the expression array. For example, when j=4, the expression array $$\sum_{i \in I} a_i x_{i,j}$$

gives only one expression, which is $$\sum_{i \in I} a_i x_{i,4}.$$

If each tangible class of the "AlgebraExpArraym" class implements the virtual function "generateCoeffs," the job of generating numerical models at the same level as the "MathModel" class can be accomplished. In other words, by implementing "generateCoeffs" method in each tangible class of the "AlgebraExpArray" class, the numerical model becomes available from within the containment chain of "MathModel" class.

Examining the "VariableArrayInExp" class first, if the indices of the "VariableArrayInExp" object, $x_{i,j}$, are given values, for example i=4 and j=2, the coefficient corresponding to the designated variable is 1 (in this example the designated variable is $x_{4,2}$). In other words, when the free index or indices are given values, the corresponding decision variable in the "VariableArrayInExp" can be determined, and its coefficient is always 1. Thus, the class "VariableArrayInExp" is capable of implementing the function "generateCoeffs."

The class "SimpleLinearExpArray" has a data member "exp" (which is a type of "AlgebraExpArray" for representing expressions), which can call the "generateCoeffs" function to obtain the coefficients corresponding to the decision variables within the sub-expressions represented by the data member "exp." Since the data member "coeff" (which is a type of "ConstantExpArray" and for representing coefficients) can call the "evaluate" function to get a numerical value, the implementation of the "generateCoeffs" method for the "SimpleLinearExpArray" class may be carried out by multiplying the result of "exp.generateCoeffs( )" with the result of "coeff.evaluate( )." In a similar fashion, implementation of "generatecoeffs" for "Sum" and "CompExpArray" may rely on calling the "generateCoeffs" through one or more of their data members, and combining the results together.

Figure 9:
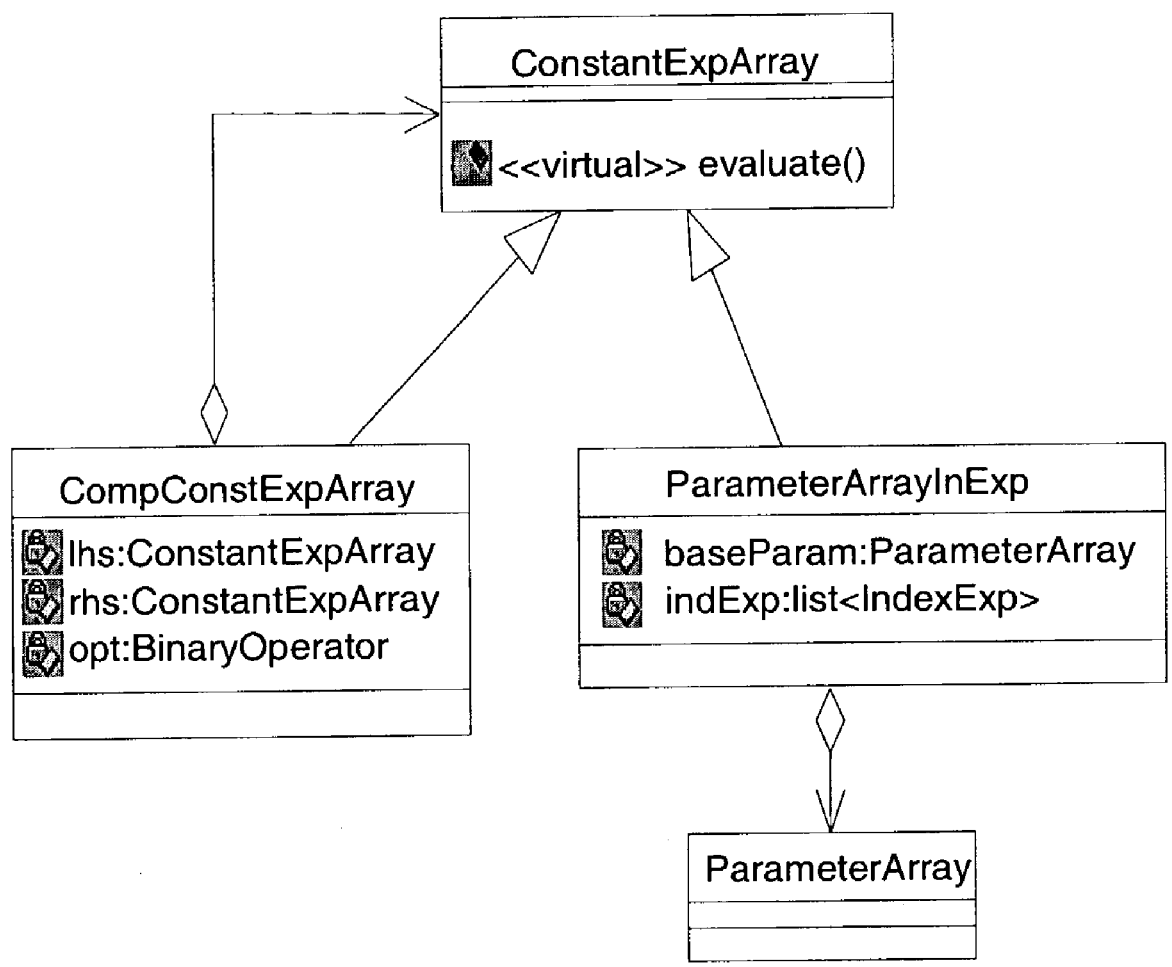
FIG. 9 shows an embodiment of a class structure for representing constant expressions.

Regarding the implementation of the virtual function "evaluate" of "ConstantExpArray," FIG. 9 shows a recursive representation schema for constant expression arrays that is similar to the recursive representation of "AlgebraExpArray" shown in FIG. 4. In FIG. 9, as long as the corresponding "ParameterArray" object is fully populated, implementing the "evaluate" function for "ParameterArrayInExp" may be accomplished by looking up the corresponding parameter value within the "ParameterArray" object once the one or more free indices are given values. For example, when j=2, the "ParameterArrayInExp" $Q_j$ would "evaluate" to the value $Q_2$. Next, the "CompConstExpArray" applies the "evaluate" function to its data members, and combines the results according to the binary operator.

Thus, the above example shows one embodiment of how a numerical instance of the model can be generated by the "MathModel" class once all the relevant "IndexSet" objects and "ParameterArray" objects are populated with values. Using a similar delegation mechanism with the containment and recursive representation explained above, incremental changes to the numerical model, due to the incremental changes made to the "IndexSet" objects and/or the "ParameterArray" objects, for example, may be generated by the "MathModel" object. After inputting the incremental changes to an "IndexSet" object and/or a "ParameterArray" object, each tangible type of "AlgebraExpArray" object and each tangible type of "ConstantExpArray" object can generate the corresponding changes to the numerical model. For example, for j=2, if the set I={1,2,3} has been altered to the set I={1,2,3,4,5}, the object "Sum"

$$\sum_{i \in I} x_{i,j}$$

has added decision variables $x_{4,2}$, $x_{5,2}$ and their corresponding coefficients are 1.

Another type of net change is adding a new type of constraint or removing a type of constraint. The corresponding net change to the numerical model can be generated using the same mechanism that generates the initial numerical model. The net changes to the objective function can be handled in a similar fashion as the net changes to the constraints.

The "IndexExp" class as well as other subclasses of the "ConstantExpArray" class are structured in a fashion that is similar to "AlgebraExpArray" in FIG. 7 and "ConstantExpArray" in FIG. 9. Consequently, the "IndexExp" class, for example, is also capable of using composite containment to recursively represent arbitrary complex index expressions.

Figure 10:
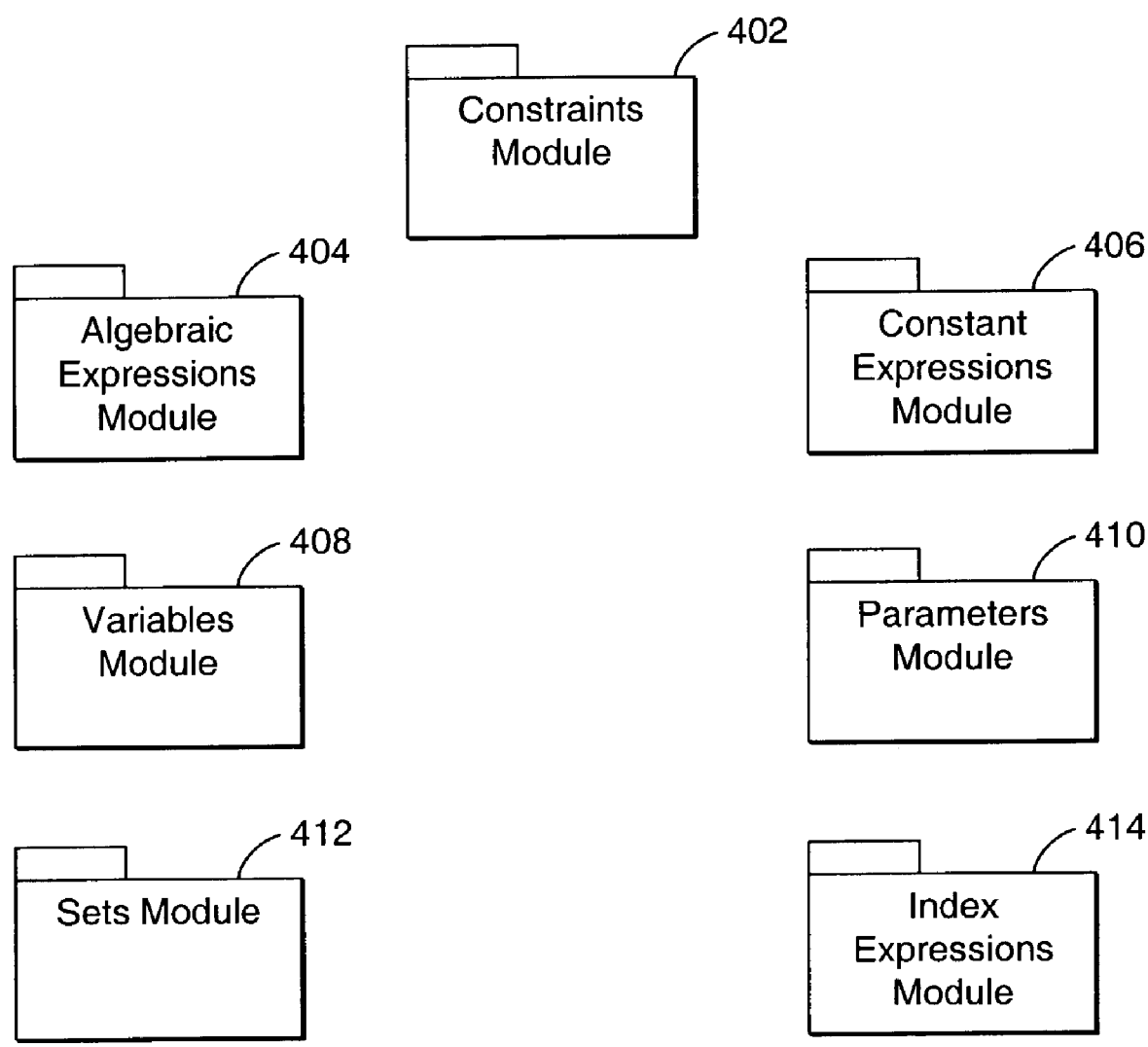
FIG. 10 shows the details of an embodiment of the model components module of FIG. 3.

FIG. 10 shows the details of an embodiment of the model components 304. In this embodiment, model components 304 has seven modules, which are a constraints module 402, an algebraic expressions module 404, a constant expressions module 406, a variables module 408, a parameters module 410, a sets module 412, and an index expressions module 414. In alternate embodiments, model components 304 may have other modules in addition to or instead of those listed above.

In an embodiment, the seven modules of FIG. 10 may contain all of the supporting components that enable "MathModel" object to provide the client interfaces. Constraints module 402 provides the facilities to build constraints and store the abstract formulas of constraints and objective functions, and in an embodiment may include the "ConstraintArray" class, and the "ConstraintArrayU" class, for example. Constraints module 402 may also provide all of the overloaded comparison operators, such as "==", ">=", and "<=," that will return a "ConstraintArrayU" object when the right hand side argument and left hand side argument are supplied.

Algebraic expressions module 404 provides recursive representation of arbitrary algebraic expressions through composition (e.g., by composing algebraic expressions from multiple terms in which each term is also an algebraic expression) and in an embodiment may include the class structure of FIG. 7, for example. One of the base classes that may be in the algebraic expressions module 404 is "AlgebraExpArray."

Constant expression module 406 provides the facilities to represent arbitrary constant expressions, and in an embodiment may include the class structure of FIG. 9, for example. In an embodiment, constant expressions module 406 may contain the classes shown in FIG. 9. One of the base classes that may be in constant expression module 406 is "ConstantExpArray."

Variables module 408 provides facilities to represent arrays of decision variables and in an embodiment may include the "VariableArrayInExp" class and the "VariableArray" class, for example. In an embodiment, the variables module 408 contains the main facilities to interact with the decision variables in the mathematical programming model. In addition to the classes "VariableArray" and "VariableArrayInExp" of FIG. 4, variables module 408 may also contain the class "VariableArrayIterator." The class "VariableArrayIterator" provides interfaces for iterating through the variables within a "VariableArray" object, and accesses the corresponding solution value. The "VariableArrayIterator" class may offer flexible traversing. For example, by fixing a dimension the remaining one or more dimensions may be traversed without traversing the elements of the fixed dimension. Also, by skipping (e.g., not enumerating) variables with a zero solution value analyzing results can be simplified, because less useless information needs to be handled.

Parameters module 410 provides facilities to represent arrays of parameters that may be involved in a mathematical programming model, and in an embodiment may include the "ParameterArrayInExp" class and the "ParameterArray" class, for example. In an embodiment, the parameters module 410 contains a main class "ParameterArray," which may have an overloaded "( )" operator that returns a "ParameterArrayInExp" object. The "( )" operator takes one or more "IndexExp" objects as input arguments. In addition to constructing the abstract model when used in "addConstraints" or "addobjective" methods of the "MathModel" class, "ParameterArray" also has interfaces to add, remove, modify, and/or access elements in a very similar fashion, such as via the "IndexSet" class. The only difference is that both the key (e.g., an index or other means of locating an element) and the value will be needed when adding an element to a "ParameterArray" object. As an example of a key, when writing a program that has data related to the ages of people, the name of the person may be used as a key for a parameter in which the actual age may be the value.

Sets module 412 provides facilities to represent the mathematical concept of index sets and the related entities, and may include the "IndexSet" class, for example. Index expressions module 414 provides facilities to represent the mathematical concept of an index and its various forms of expression, and in an embodiment may include the "Index" class and the "IndexExp" class, for example. In an embodiment, index expressions module 414 contains the main class "IndexExp" and its subclasses of which "Index" is one of them. There may be other subclasses of "IndexExp" to represent other types of index expressions. For example, a class that may be named "Previous" and a class that may be named "Next" may be used to represent the element position one element before and one element after a given position respectively. In an embodiment, there may be overloaded operators, such as "+," "−," "*," and "/," which will return an object of "IndexExp" when a left hand side argument and a right hand side argument that are appropriate for the operator in question are given.

Figure 11:
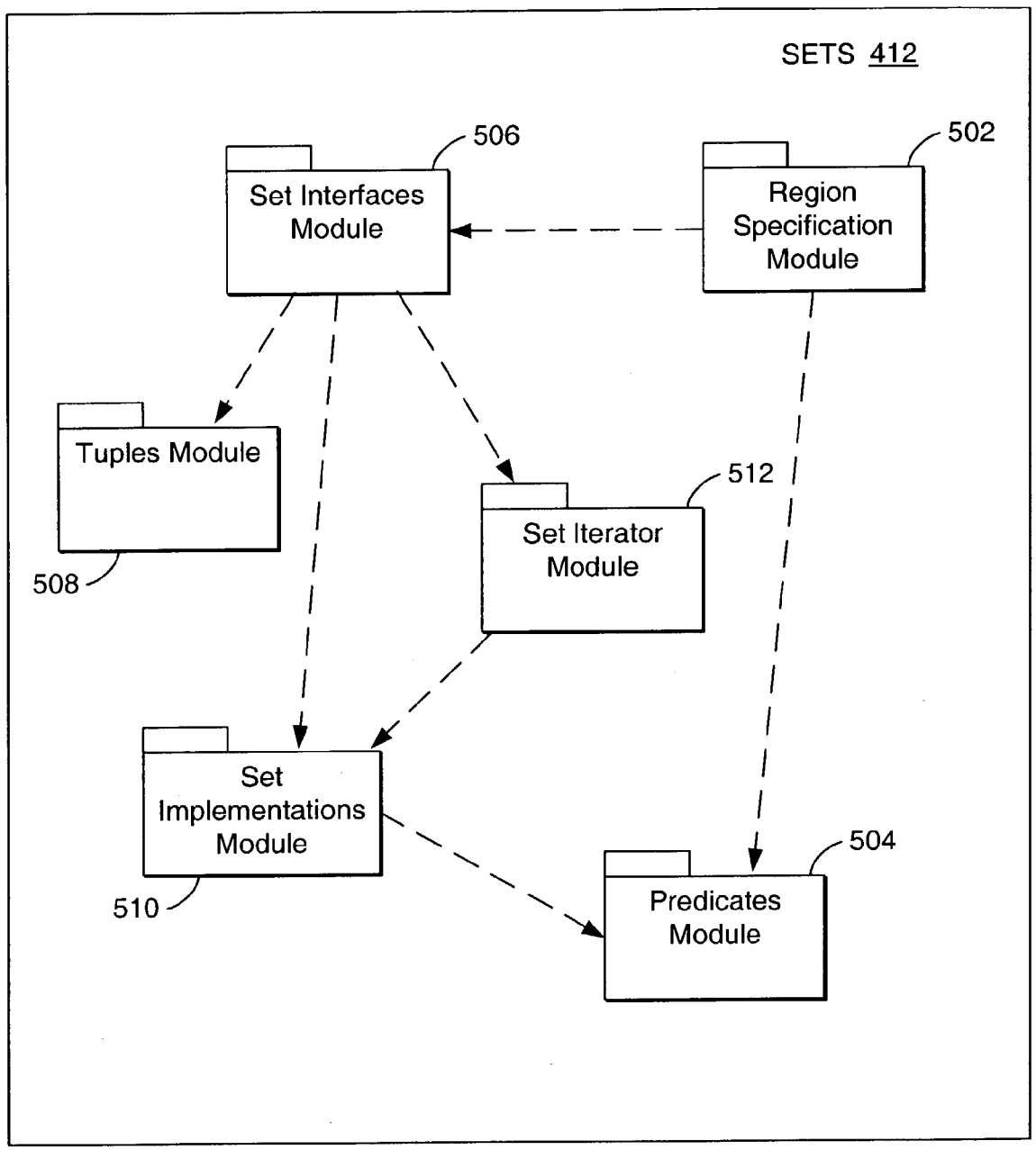
FIG. 11 is a block diagram of an embodiment of the sets module of FIG. 10.

FIG. 11 shows the details of an embodiment of sets module 412. In an embodiment, sets module 412 may include a region specification module 502, a predicates module 504, a set interfaces module 506, a tuples module 508, a set implementations module 510, and a set iterator module 512. In alternate embodiments, sets module 412 may have other modules in addition to or instead those listed above.

The region specification module 502 provides facilities to specify the domain on which a set of constraints is defined or summation should be performed. Region specification module 502 provides facilities for representing regions, and in an embodiment may include at least two main classes, "Over" and "Over::Iterator" (an iterator inner class of the "Over" class). The inner class "Over::Iterator" provides the capability to iterate through a region represented by an "Over" object. Through the inner class "Over::Iterator" one can reference the element an iterator is currently pointing to. Region specification module 502 depends on predicates module 504 and set interfaces module 506 for providing ways of limiting the region specified.

The predicates module 504 provides the facilities to express the condition that elements in a given set has to satisfy and thus allows one to restrict a particular subset when referencing a given set. In an embodiment, the predicates module 504 contains classes and operators that support the usage of predicates in two instances, which are (1) when constructing a set from another existing set, and (2) when specifying a region as a subset of an existing set. In an embodiment, comparison operators such as "==," "!=," ">," ">=," "<," and "<=," may be overloaded to return a predicate object when a left hand side argument and a right hand side argument that are of a type appropriate for the operator in question are given.

Set interfaces module 506 provides the representation for index sets and related facilities to interact with an index set. The representation of the index sets of set interfaces module 506 may be used by region specification module 502 for defining a region. In an embodiment, set interfaces module 506 may provide the class "IndexSet" to represent an index set, as discussed above in conjunction with FIG. 4. Set interfaces module 506 depends on tuples module 508, set implementations module 510, and set iterator module 512.

Tuples module 508 provides the representation of an element in a one-dimensional or multi-dimensional set. In an embodiment, tuples module 508 of FIG. 11 may provide classes to represent one element in a set. In an embodiment, a base class, which may be referred to as "Tuple," may be used to represent any type of element. The class "Tuple" provides the common interfaces for all types of tuples. The class "Tuple" may be used in most interfaces where a generic element is expected. Elements of different dimensions may be represented by derived classes of the "Tuple" class. In one embodiment, a template class of C++ may be used to represent elements of specific dimensions. For example, a two-dimensional element may be represented by template class "Pair<T1, T2>", where T1 or T2 may take on the values of either integer, string, or object.pointer, for example. In an embodiment, a special derived class of "Tuple," which may be called "IndexValue," may be used to represent one-dimensional elements. "IndexValue" may be used wherever an element of one dimension is expected. In an embodiment, one derived class of the "Tuple" class, which may be called "Ntuple," may be used to represent an element of an arbitrary number of dimensions.

Set implementations module 510 provides the facilities for handling of the internal storage of elements within a set. Set iterator module 512 provides the facilities to iterate through various types of sets in many useful manners. In an embodiment, set iterator module 512 may provide the support to traverse the class "IndexSet" (traversing an "IndexSet" may include enumerating the elements of the index set represented by the "IndexSet" object, for example).

The set iterator module 512 may contain an iterator class as an inner class of the "IndexSet" class, e.g., "IndexSet::Iterator." The "IndexSet::Iterator" inner class may have the normal functionality of iterating though an "IndexSet" object. In an embodiment, the "++" operator and the "−−" operators may be overloaded to provide the iterator function of stepping through the elements of an "IndexSet" object. The "IndexSet::Iterator" inner class may also retrieve the element of the "IndexSet" object that the iterator is currently pointing to. When iterating through a multi-dimensional "IndexSet" object, "IndexSet::Iterator" may provide a mechanism to traverse the members of a set while one or more dimensions are fixed. For example, if one has a three dimensional "IndexSet" object of I={(1,1,1), (1,1,2), (1,2,1), (1,2,2), (1,3,1), (1,3,2)}, fixing the $2^{nd}$ dimension to the value of 2 and traversing I returns elements {(1,2,1), (1,2,2)}.

Figure 12:
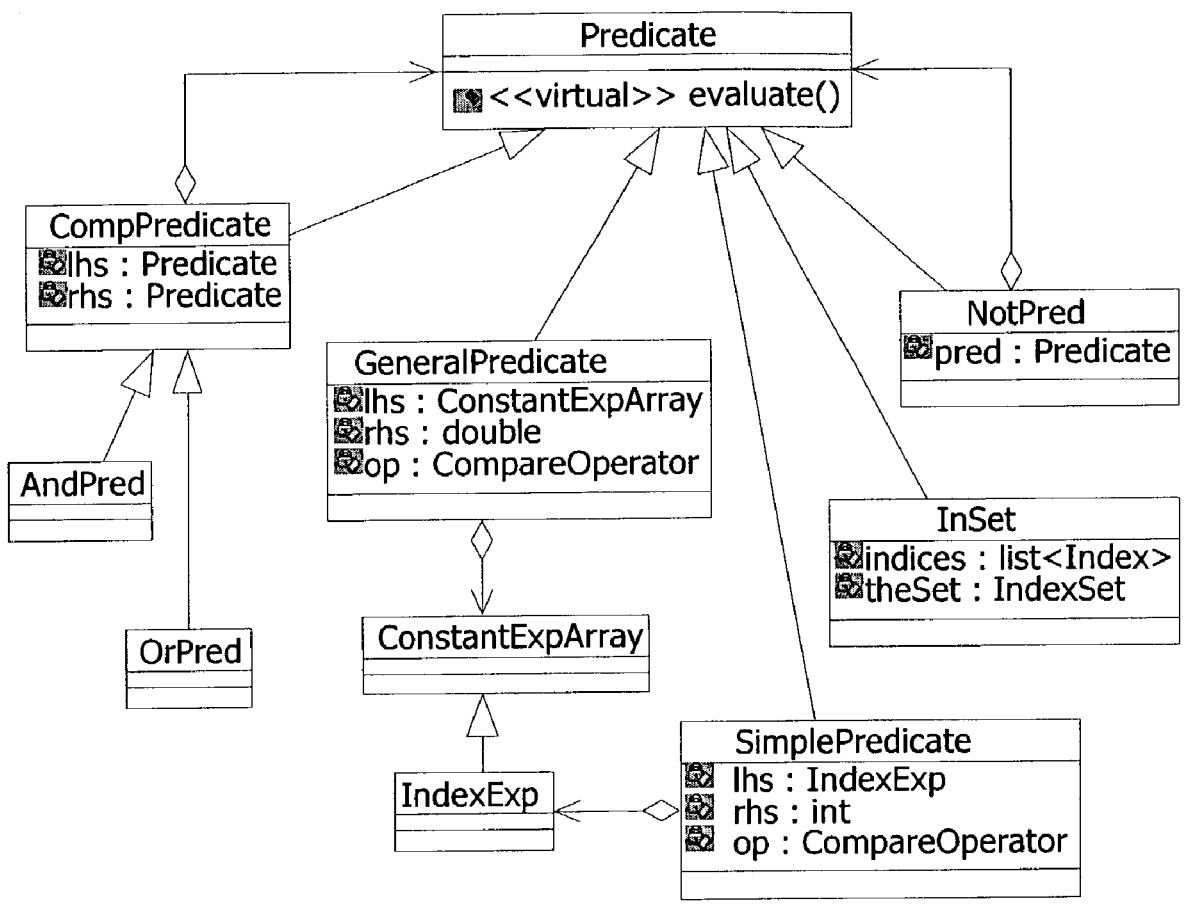
FIG. 12 shows an embodiment of a class structure for representing the predicate module of FIG. 11.

FIG. 12 shows an example of a predicate representation. The description of each class of FIG. 12 is in FIG. 13. The predicate representation of FIG. 12 may be an embodiment of predicates module 504 (FIG. 11). Given values for all the free indices, a "Predicate" class can, via the virtual function "evaluate," evaluate to true or false. In predicates module 504, comparison operators (such as, >, <, >=, <=, ==, etc.) are overloaded to produce a "Predicate" object when given the left hand side argument and right hand side argument that are appropriate to the operator. The following code segment shows the predicate usage in constructing one "IndexSet" object from an existing "IndexSet" object using a predicate.

```
// Assume "S1" is a 3-dimensional "IndexSet."
Index i, j, k;
IndexSet S2(S1, i, j, k, i>10);
IndexSet S3(S1, i, j, k, 2*j+k–i<=30);
```

The next code segment shows the predicate usage in specifying a region with an "Over" object:

```
IndexSet I(0, 1, 1000), J(0, 1, 2000), K(0, 1, 300), IJ(I, J);
Index i, j, k;
VariableArray x(I,J,K);
// Assume "myModel" is of the type "MathModel."
myModel.addConstraints(Over(i,j,IJ, i+j !=100), Sum
    (Over(k,K), x(i,j,k))<=1);
```

By using a predicate in the above code segment, when constructing a set from another existing set and when specifying a region as a subset of an existing set, the modeling language becomes very flexible in terms of the range of types of expressions that can be written.

Figure 14:
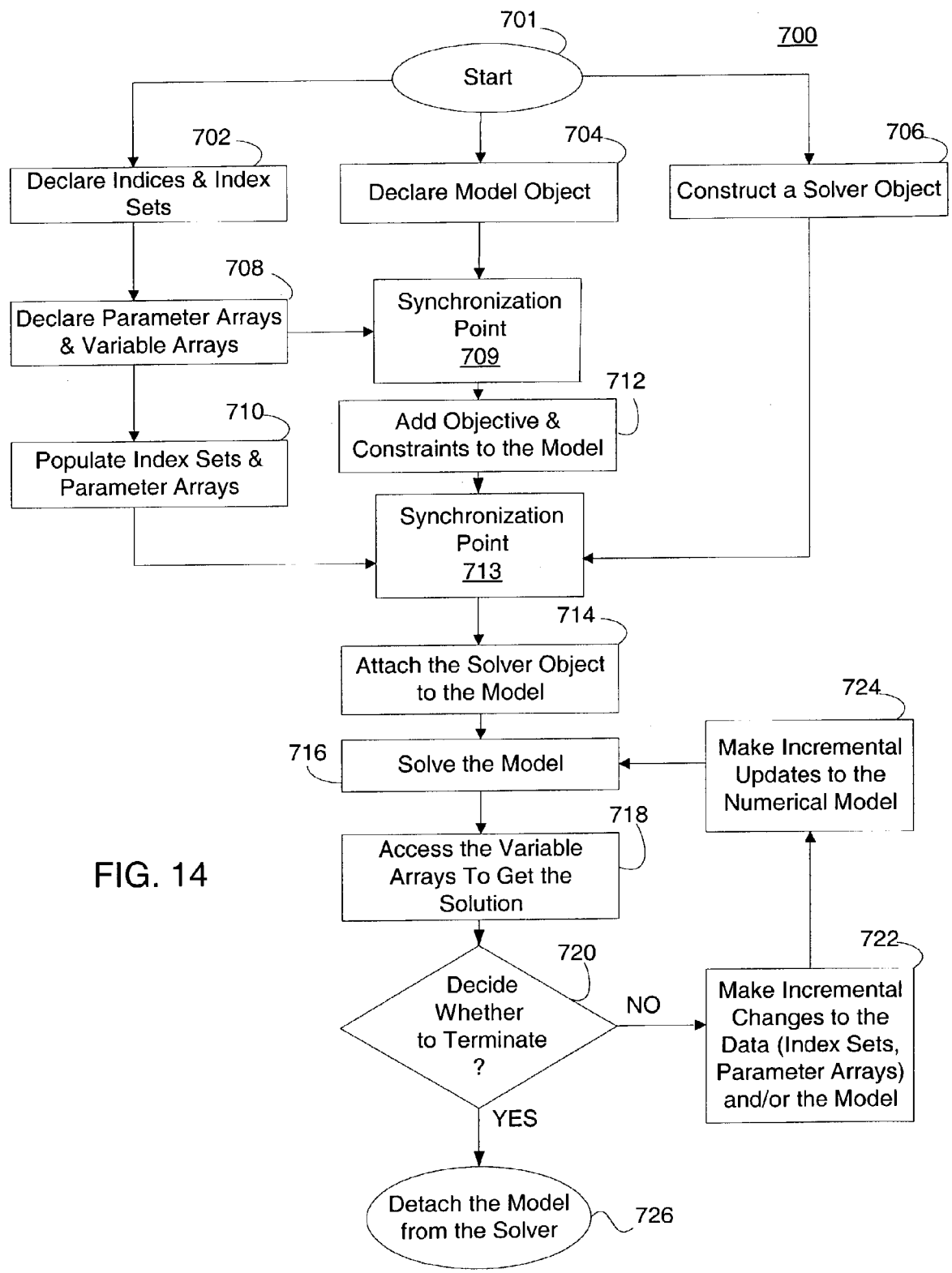
FIG. 14 is a flowchart for a method of using the libraries of FIG. 2 to solve a problem.

FIG. 14 is a flowchart for a method of using the modeling language of libraries 206 to solve a problem. Method 700 begins with step 701 in which the user starts programming. Step 701 may involve starting application 204 or opening a new project within application 204, for example. If the user is already within the midst of writing a program, step 701 may be the first of the steps that follow to be performed. From step 701, the three steps 702, 704, or 706 may follow in parallel or in any order with respect to one another. In step 702, the indices and index sets, such as the "Index" and "IndexSet" objects, that will be used later are declared. Each "IndexSet" object may include one or more "IndexSet" objects declared earlier. In step 704, a "MathModel" object is declared. In step 706, a solver object may be constructed that is tailored for the problem being solved.

Following step 702, in step 708, the "ParameterArray" objects and "VariableArray" objects that will be used in building the model are declared. In declaring a "ParameterArray" or "VariableArray" object, the "Index" and "IndexSet" objects declared in step 702 may be used. Following step 704 and step 708, is synchronization point 709. Before proceeding to steps after a synchronization point (e.g., synchronization point 709), all of the steps feeding into and before the synchronization point must be completed.

After synchronization point 709, step 712 follows, during which the objective function and constraints may be added to the model using the "addObjective" method and "addConstraints" method of the "MathModel" class, for example. Following step 708, in step 710, the "IndexSet" and "ParameterArray" objects may be populated with members using the interfaces that the objects provide. After steps 706, 710, and 712, comes synchronization point 713.

Following synchronization point 713 is step 714, during which the solver object is attached to the model object using the "attach" method of the "MathModel" class. Following step 714, in step 716, the model is solved using the solver. The solver returns the solution to the model (storing it in the "VariableArray" object). Next, in step 718, the "VariableArray" object may be accessed for viewing the solution. In step 720, a decision is made whether to terminate method 700. If it is decided not to terminate method 700, step 722 follows, during which incremental changes are made to either the data (e.g., the "IndexSet" objects and the "ParameterArray" objects), the model, and/or both. In step 724, the "updateModel" method of the "MathModel" class is called, which generates the incremental changes of the numerical model and sends the changes to the solver. Following step 724, method 700 returns to step 716, which was described above. If in step 720, it is decided to terminate step 700, step 726 follows, during which the model is detached from the solver by calling the "detach" method of the "MathModel" object.

As an example demonstrating method 700 and demonstrating one embodiment of the modeling language, a location/distribution problem is shown in Appendix I. The corresponding formulation is given in Appendix II. The C++ code that implements the mathematical programming model is given in Appendix III. Appendices II and III include a one to one correspondence between the mathematical expression and the C++ code in the high level modeling language.

The disclosure is not limited to the specific classes disclosed in FIGS. 4, 6, 7, 9, and 12. For example, the "MathModel" class may be replaced with any math model class or class for representing mathematical models. The "ConstraintArray" class may be replaced with any constraint array class or class for representing arrays of constraints. The "ConstraintArrayU" class may be replaced with any unbounded constraint array class or class for representing unbounded constraint arrays. The "Over" object may be replaced by any region object or a range object or class for representing regions or ranges of indices. The "IndexSet" class may be replaced with any index set class or class for for representing index sets. The "Index" class may be replaced by any index class or class for representing indices. The "addConstraints" method may be replaced with any add constraints method or method for adding constraints.

Similarly, the "Previous" and "Next" classes may be replaced by any previous and next classes or classes for addressing the previous and next elements in a set. The "updateModel" method may be replaced with any update method or method updating the mathematical programming model. The "IndexExp" class may be replaced by any index expression class or class for representing index expressions. The "ConstantExpArray" class may be replaced by any constant expression array class or class for representing constant expression arrays.

Additionally, the "evaluateInt" method may be replaced with any evaluate integer method or method for evaluating integers, arrays of integers, integer expressions, and/or arrays of integer expressions. The "AlgebraExpArray" class may be replaced by any algebra expression array class or class for representing algebra expression arrays. The "VariableArrayInExp" class may be replaced by any variable array having an index expression class or class for representing variable arrays having index expressions. The "Sum" class may be replaced by any sum class or class for representing a summation. The "ParameterArrayInExp" class may be replaced with any parameter array index expression array or class for representing a parameter array having an index expression. The "ParameterArray" class may be replaced by any parameter array class or class for representing parameter arrays. The "CompareOperator" object may be replaced by any compare operator object or any operator sufficiently overloaded to perform comparison operations with algebraic expressions objects and/or constant expressions objects.

Also, the "generatecoeffs" method may be replaced with any generate coefficient method or method for generating coefficients. The "evaluate" method may be replaced by any evaluate method or method for evaluating expressions. The "CompExpArray" class may be replaced with any composite expression array class or class for representing composites of arrays of expressions. The "VariableArrayIterator" class may be replaced by any variable array iterator class or class for representing iterators for variable array objects.

Further, the "Tuple" class may be replaced by any tuple class or class for representing tuples, and the "NTuple" class may be replaced by any multi-dimensional tuple class or class for representing tuples in which the number of dimensions can be chosen. The "IndexValue" class may be replaced with any index value class or tuple class for representing a one-dimensional element. The "Predicate" class may be replaced by any predicate class or class for representing predicates.

Similarly, system 100 may include overloaded operators "[ ]" and "{ }" in addition to or instead of overloaded operator "( )," for example. Also, other symbols may be used for the overloaded operators, such as the overloaded operators "=," "!=," "+," "−," "/," "*," ">=," "<=," "++," "−−," and "==," an other overloaded operators may be provided for performing other logical or mathematical operations (such as integration and taking the absolute value) or other types of operations (such as operations on strings of characters).

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

Appendix I

Company XYZ has 100 stores in the San Francisco Bay Area. It plans to build a few warehouses to supply the 100 stores. Company XYZ has identified 6 potential sites to build warehouses. A rough approximation is that each store has the same amount of annual sales and requires the same amount of supplies from the warehouses. A further assumption is that each store will get its supplies from one and only one warehouse. The capacity of a warehouse is measured in terms of how many stores the warehouse can serve. The following table lists the maximum capacity warehouse Company XYZ can build at each potential site.

| Site | San Mateo | San Francisco | San Jose | Dublin | Berkeley | Fremont |
|---|---|---|---|---|---|---|
| Max Capacity | 20 | 16 | 30 | 35 | 20 | 30 |

The annual cost (in thousands of dollars) of supplying a store from a particular site, if a warehouse is built at that site, is in the next table.

| | Site | | | | | |
|---|---|---|---|---|---|---|
| Store | San Mateo | San Francisco | San Jose | Dublin | Berkeley | Fremont |
| Store 1 | 300 | 450 | 350 | 500 | 560 | 400 |
| ... | ... | ... | ... | ... | ... | ... |
| Store 100 | 600 | 780 | 560 | 450 | 500 | 480 |

Company XYZ needs to decide its warehouse location/capacity and its distribution network to minimize the total cost of supplying its stores. The primary cost in supplying the stores is the transportation. Specifically, the questions that need to be answered are:

1. At each potential warehouse site, should the company build a warehouse? If yes, how big should the capacity be?
2. Once the warehouses are built, which store should be supplied by which warehouse?

Appendix II

The Parameters
  Let N be the number of stores in the problem.
  Let M be the number of potential warehouse locations.

The Sets
  Let I be the set of stores (e.g., I={1,2, . . . ,100}).
  Let J be the set of potential warehouse locations (e.g., J={1,2, . . . ,6}).

The Indices
  Let i be the index defined on the set of stores I (i.e., i∈I).
  Let j be the index defined on the set of sites J (i.e., j∈J).

The Parameter Arrays
  Let $Q_j$ be the maximum capacity of site j.
  Let $c_{i,j}$ be the annual cost of supplying store i from site j.

The Decision Variables
  Let $x_{i,j}$ be 1 if store i will be supplied by a warehouse at site j, and be 0 if it will not. Once $x_{i,j}$ is determined, all questions posed in the problem statement can be answered. For example, $$\sum_{i \in I} x_{i,j}$$

is the warehouse capacity to be built at site j. If warehouse capacity is 0, then Company XYZ does not need to build a warehouse at site j.

The Objective
  The objective is to minimize the total transportation cost, which can be accomplished by minimizing $$\sum_{i \in I} \sum_{j \in J} c_{i,j} x_{i,j}.$$

The Constraints (1) Each store should be supplied by one and only one warehouse, which can be written mathematically as $$\sum_{j \in J} x_{i,j} = 1 \quad \forall\, i \in I.$$

(2) Each warehouse to be built at a particular site should not exceed the maximum capacity, which can be written mathematically as $$\sum_{i \in I} x_{i,j} \leq Q_j \quad \forall\, j \in J.$$

APPENDIX III

| Line # | C++ CODE USING THE SUPPORT OF LIBRARIES 206 FOR SOLVING THE LOCATION/DISTRIBUTION PROBLEM |
|---|---|
| 1 | // Modeling Warehouse Location/Distribution problem written in the high- |
| 2 | // level modeling language language built on top of C++ |
| 3 | int main(int argc, const char* argv[ ]) |
| 4 | { |
| 5 | // other application code ... |
| 6 | |
| 7 | //---Begin the Model |
| 8 | const int N = 100; // "N" is the number of stores. |
| 9 | const int M = 6; // "M" is number of sites. |
| 10 | |
| 11 | // "IndexSet" is a class supplied by libraries 206. |
| 12 | IndexSet I(1, 1, N); // This defines an integer set having start=1, //increment=1, end="N." |
| 13 | IndexSet J(1, 1, M); // Integer set "J" is similar to "I." |
| 14 | |
| 15 | // "Index" is a class supplied by libraries 206. |
| 16 | Index i, j; |
| 17 | |
| 18 | // "ParameterArray" is a class supplied by libraries 206. |
| 19 | ParameterArray Q(J); // "Q(J)" is the max capacity parameters for // potential sites. |
| 20 | ParameterArray c(I, J); // "c(I,J)" is the supply cost from a site to a store. |
| 21 | |
| 22 | // "VariableArray" is a class supplied by libraries 206. |
| 23 | VariableArray x(I, J); // Define decision variable "x" on sets "I" and "J." |
| 24 | x.setType(VariableArray::Binary); // This sets the variable type to //"Binary." |
| 25 | |
| 26 | // "MathModel" is a class supplied by libraries 206. |
| 27 | MathModel locModel; |
| 28 | |
| 29 | // "Over" and "Sum" are classes supplied by libraries 206. |
| 30 | // Use overloaded operators "*," "( )" to achieve high level semantics. |
| 31 | locModel.addObjective(Sum(Over(i, I), Sum(Over(j, J), c(i,j) * x(i,j)))); |
| 32 | |
| 33 | // Use overloaded operators "( )," "==" to achieve high level semantics. |
| 34 | locModel.addConstraints(Over(i, I), Sum(Over(j, J), x(I,j)) == 1); |
| 35 | |
| 36 | // Use overloaded operators "( )," "<=" to achieve high level semantics. |
| 37 | locModel.addConstraints(Over(j, J), Sum(Over(i, I), x(I,j)) <= Q(j)); |
| 38 | |
| 39 | // "MIPSolver" is a class supplied by solver interface 212. |
| 40 | MIPSolver mySolver; |
| 41 | |
| 42 | // application code to populate "Q" and "c" ... |
| 43 | |
| 44 | // The numerical model is generated based on the abstract model and the |
| 45 | // data ("IndexSet" and "ParameterArray"). The numerical result is |
| 46 | // passed on to the solver. |
| 47 | locModel.attach(mySolver); |
| 48 | |
| 49 | // Bring the solution back from the solver. |
| 50 | locModel.solve( ); |
| 51 | |
| 52 | // Access the solution results through the variable "x." |
| 53 | |
| 54 | // Assume that part of the parameters "Q" and "c" may be changed, or |
| 55 | // that the sets "I" and "J" have been modified (stores were added/deleted |
| 56 | // and/or potential sites were added/deleted). |
| 57 | // Update the model with net changes, and return the updated solution. |
| 58 | locModel.updateModel( ); |
| 59 | |
| 60 | // Access the updated solution result through the variable "x." |
| 61 | // The program may go back to line 54 for further interactive changes. |
| 62 | //---End Model |
| 63 | |

APPENDIX III-continued

C++ CODE USING THE SUPPORT OF LIBRARIES 206 FOR SOLVING THE LOCATION/DISTRIBUTION PROBLEM

| Line # | |
|---|---|
| 64 | // other application code ... |
| 65 | } // end main |

What is claimed is:

1. A system for providing mathematical modeling in an object-oriented software environment, comprising:
a processor operable to execute instructions contained in computer program code; and
at least one computer readable medium including instructions in an object-oriented programming language that, when executed by the processor, cause the processor to:
provide at least one library including a model class that when instantiated as a model object provides an interface allowing user interaction with a mathematical programming model, the mathematical programming model configured for generating a solution for a mathematical decision making problem;
generate a numerical model, based on instance data associated with one or more parameters and one or more index sets of the mathematical programming model;
solve the mathematical programming model using a selected solver running in the object-oriented programming language; and
output a result of the solving process,
wherein the model class instantiated as a user interface object comprises a set of methods to allow a user to add/remove mathematical expressions, constraints, or objective functions to/from the mathematical programming model, pass the instance data to a selected solver for solving the mathematical programming model, solve the numerical model through the solver and return the solution, and update the mathematical programming model with at least one incremental change to be passed to the selected solver.

2. The system of claim 1, further comprising a compiler associated with the programming language.

3. The system of claim 1, wherein the model object stores, as data members of the model class, one or more abstract formulas associated with the model object without incurring storage costs associated with a numerical instance of the mathematical programming model.

4. The system of claim 1, wherein the model class represents at least one index that is capable of:
referring to an element in a one-dimensional set; and
referring to one dimension of an element in a multi-dimensional set, the element of the multi-dimensional set is capable of being used to address
a particular decision variable in an array of decision variables, and
a particular parameter in an array of parameters.

5. The system of claim 1, further comprising program code for providing at least an index set class supporting constructors to construct an index set object, having a restricted index set, from another existing index set object having an existing index set by forming the restricted index set from a subset of the existing index set of the existing index set object.

6. The system of claim 1, further comprising program code for distinguishing whether an index set of an index set object is part of an initial building state or part of an incremental change state, and if the index set is part of the incremental change state, keeping track of incremental changes made to the index set.

7. The system of claim 1, further comprising program code for providing at least a variable array class to represent an array of decision variables in the mathematical programming model, and the variable array class supports at least:
defining a variable array on a one-dimensional set;
defining a variable array on a multi-dimensional set;
setting at least one bound for at least one decision variable selected from the array of decision variables;
building the mathematical programming model using expressions containing the array of decision variables; and
referring to decision variables associated with the array of decision variables by using an object handle together with at least one index, wherein the mathematical programming model is configured for generating proper values for the array of decision variables.

8. The system of claim 1, further comprising program code for providing at least a parameter array class that represents an array of parameters and a method of the class for setting a type of a parameter array object as a parameter array that forwards a request to look up a particular parameter in the parameter array to an external object and has no need to explicitly store any parameter in the parameter array object.

9. The system of claim 1, further comprising program code for providing a range class that represents a valid region within a set, and the range class supports specifying a valid range for a set of constraints.

10. The system of claim 1, further comprising program code for providing a range class that represents a valid region within a set, and the range class supports specifying a valid range to compute a summation.

11. The system of claim 1, further comprising program code for providing a base class for representing constant expression arrays that do not contain decision variables, and a plurality of subclasses for representing specific types of the constant expression arrays, one category of the plurality of subclasses being for representing constant expression arrays having integer values.

12. The system of claim 1, further comprising program code for providing at least one comparison operator, a constraint type of a mathematical programming model being expressible without specifying a valid range of the constraint type, the constraint type being expressible as an algebraic expression array object on a left hand side of the comparison operator and a constant expression array object on a right hand side of the comparison operator.

13. The system of claim 1, further comprising program code for providing a predicate object that is useable in a constructor of a range object, therein restricting the index set that the range object represents.

14. The system of claim 1, wherein the mathematical programming model configured for generating the solution of the mathematical decision making problem involves determining proper values for a set of decision variables, such that an objective function of the decision variables is minimized or maximized while satisfying a set of constraints involving the decision variables.

15. A system for providing mathematical modeling in an object-oriented software environment, comprising:
- a processor operable to execute instructions contained in computer program code; and
- at least one computer readable medium including instructions in an object-oriented programming language that, when executed by the processor, cause the processor to:
- provide a base class representing an array of algebra expressions that contains at least one decision variable and a plurality of subclasses representing specific types of algebra expression arrays;
- provide at least one library including a model class that when instantiated as a model object provides an interface allowing user interaction with a mathematical programming model including at least one object type and at least one operator definition in the object-oriented programming language relating to a mathematical expression, the model class being further able to access and utilize the at least one decision variable and a plurality of subclasses of the provided base class, the mathematical programming model representing a decision making problem and being configured for generating a proper value for the at least one decision variable;
- generate a numerical model, based on instance data associated with one or more parameters and one or more index sets of the mathematical programming model;
- solve the numerical model using a selected solver running in the object-oriented programming language; and
- output a result of the solving process,
- wherein the model class instantiated as a user interface object comprises a set of methods to allow a user to add/remove mathematical expressions, constraints, or objective functions to/from the mathematical programming model, pass the instance data to a selected solver for solving the mathematical programming model, solve the numerical model through the solver and return the solution, and update the mathematical programming model with at least one incremental change to be passed to the selected solver.

16. The system of claim 15, further comprising program code for providing a subclass of an algebra expression array class that supports a summation of an indexed algebra expression array over an index set.

17. The system of claim 15, further comprising program code for providing overloaded operators, such that an algebra expression array object can be formed using component algebra expression array objects joined by one of the overloaded operators.

18. A system for providing mathematical modeling in an object oriented software environment, comprising a processor and at least one computer-readable medium equipped with:
- means for executing instructions in an object-oriented programming language;
- means for providing at least one library including a model class that when instantiated as a model object provides an interface allowing user interaction with a mathematical programming model, the mathematical programming model configured for generating a solution for a mathematical decision making problem;
- means for generating a numerical model, based on instance data associated with one or more parameters and one or more index sets of the mathematical programming model;
- means for solving the mathematical programming model using a selected solver running in the object-oriented programming language; and
- means for outputting a result of the solving process;
- wherein the model class instantiated as a user interface object comprises a set of methods to allow a user to add/remove mathematical expressions, constraints, or objective functions to/from the mathematical programming model, pass the instance data to a selected solver for solving the mathematical programming model, solve the numerical model through the solver and return the solution, and update the mathematical programming model with at least one incremental change to be passed to the selected solver.

* * * * *

UNITED STATES PATENT AND TRADEMARK OFFICE
CERTIFICATE OF CORRECTION

| | |
|---|---|
| PATENT NO. | : 7,546,578 B2 |
| APPLICATION NO. | : 10/439913 |
| DATED | : June 9, 2009 |
| INVENTOR(S) | : Jin Yang |

It is certified that error appears in the above-identified patent and that said Letters Patent is hereby corrected as shown below:

In column 3, line 56, delete "vendors" and insert -- vendors, --, therefor.

In column 3, line 60, delete "possible" and insert -- possibly --, therefor.

In column 4, line 10, after "the" delete "the".

In column 4, line 29, delete "languages" and insert -- languages, --, therefor.

In column 4, line 38, delete "obj3:" and insert -- obj3; --, therefor.

In column 4, line 40, delete "if(1)" and insert -- if (1) --, therefor.

In column 4, line 40, delete "date" and insert -- data --, therefor.

In column 4, line 46, after "symbols" insert -- , --.

In column 4, line 48, delete "languages" and insert -- language --, therefor.

In column 4, line 50, delete "entities," and insert -- entities --, therefor.

In column 12, line 2, delete "AlegebraExpArray." and insert -- AlgebraExpArray. --, therefor.

In column 12, line 19, delete "C++code" and insert -- C++ code --, therefor.

In column 12, line 24, delete "(Over(j,J,   2*j-P(j)>1))," and insert -- (Over(j,J,2*j-P(j)>1), --, therefor.

In column 12, line 45, delete "$C_{i,j}$" and insert -- $c_{i,j}$ --, therefor.

In column 15, line 20, delete ""AlgebraExpArraym"" and insert -- "AlgebraExpArray" --, therefor.

In column 15, line 49, delete ""generatecoeffs"" and insert -- "generateCoeffs" --, therefor.

Signed and Sealed this

First Day of June, 2010

David J. Kappos
*Director of the United States Patent and Trademark Office*

CERTIFICATE OF CORRECTION (continued)
U.S. Pat. No. 7,546,578 B2

In column 17, line 28-29, delete ""addobjective"" and insert -- "addObjective" --, therefor.

In column 18, line 46, delete "object.pointer," and insert -- object pointer, --, therefor.

In column 20, line 44, after "for" delete "for".

In column 21, line 11, delete ""generatecoeffs"" and insert -- "generateCoeffs" --, therefor.

In column 24, line 4, after "language" delete "language".